United States Patent
Kriss

(10) Patent No.: US 12,333,480 B2
(45) Date of Patent: *Jun. 17, 2025

(54) SYSTEM-INDEPENDENT DATA LOGGING

(71) Applicant: KLATU Networks, LLC, Poulsbo, WA (US)

(72) Inventor: Richard Kriss, Poulsbo, WA (US)

(73) Assignee: KLATU Networks, Inc., Poulsbo, WA (US)

( * ) Notice: Subject to any disclaimer, the term of this patent is extended or adjusted under 35 U.S.C. 154(b) by 28 days.

This patent is subject to a terminal disclaimer.

(21) Appl. No.: 18/520,541

(22) Filed: Nov. 27, 2023

(65) Prior Publication Data

US 2024/0095655 A1    Mar. 21, 2024

Related U.S. Application Data

(63) Continuation of application No. 16/589,089, filed on Sep. 30, 2019, now Pat. No. 11,829,929, which is a continuation of application No. 14/457,055, filed on Aug. 11, 2014, now Pat. No. 10,430,750.

(60) Provisional application No. 61/864,452, filed on Aug. 9, 2013.

(51) Int. Cl.
*G06Q 10/0833* (2023.01)
(52) U.S. Cl.
CPC .................. *G06Q 10/0833* (2013.01)
(58) Field of Classification Search
CPC .................................................. G06Q 10/0833
See application file for complete search history.

(56) References Cited

U.S. PATENT DOCUMENTS

| | | | |
|---|---|---|---|
| 7,212,829 B1* | 5/2007 | Lau | H04L 67/52 |
| | | | 340/8.1 |
| 9,019,535 B1* | 4/2015 | Hansen | G06F 3/1203 |
| | | | 358/1.9 |
| 2004/0054887 A1* | 3/2004 | Paulsen, Jr. | H04L 63/0428 |
| | | | 709/206 |
| 2004/0246130 A1 | 12/2004 | Lambright et al. | |
| 2005/0182598 A1 | 8/2005 | Reel et al. | |
| 2008/0231453 A1 | 9/2008 | Corder | |
| 2008/0294334 A1 | 11/2008 | Jo et al. | |

(Continued)

FOREIGN PATENT DOCUMENTS

| | | |
|---|---|---|
| WO | 2010091217 A2 | 8/2010 |
| WO | 2012091655 A1 | 7/2012 |
| WO | 2013114408 A1 | 8/2013 |

OTHER PUBLICATIONS

IBM, Authenticating electronic mail address and tracking their distribution, IP.com Prior Art Database (Year: 2004).*

(Continued)

*Primary Examiner* — Rupangini Singh
(74) *Attorney, Agent, or Firm* — Loza & Loza, LLP; Anthony Smyth

(57) ABSTRACT

Systems and methods are described for tracking a shipping container. Information from a third-party shipping entity is combined with information retrieved from a data logger attached to the shipping container while the shipping container is in transit. The third-party portal provides updates through Email or the like, transmitted to an address that is uniquely associated with the shipping container and its current itinerary.

20 Claims, 12 Drawing Sheets

(56) References Cited

U.S. PATENT DOCUMENTS

| | | |
|---|---|---|
| 2008/0306831 A1* | 12/2008 | Abraham ............ G06Q 30/0603 |
| | | 705/26.8 |
| 2010/0274604 A1 | 10/2010 | Crilly |
| 2011/0012731 A1 | 1/2011 | Stevens |
| 2011/0307357 A1 | 12/2011 | Parameswaran et al. |
| 2012/0315955 A1 | 12/2012 | Chandaria |
| 2013/0265155 A1 | 10/2013 | Wible et al. |
| 2013/0268113 A1* | 10/2013 | Sandvik ................ G06Q 10/08 |
| | | 700/215 |
| 2014/0337245 A1 | 11/2014 | Bhatt et al. |

OTHER PUBLICATIONS

Corresponding EP Appln. No. 14834360.1. Supplementary Search Report (Jan. 2, 2017).
Corresponding PCT Appl. No. PCT/US2014/050600. Int'l Search Report & Written Opinion (Dec. 15, 2014).
Email Text Messages "Complete list of sms email addresses" https://web.archive.org/web/20111130065254/http://www.emailtextmessages.com (2011).
IBM, Authenticating electronic mail address and tracking their distribution, IP.com Prior Art Technical Disclosure, IP.com No. IPCOM000033638D, Dec. 20, 2004 (Year: 2004).

* cited by examiner

SYSTEM-INDEPENDENT DATA LOGGING

PRIORITY CLAIM

This application is a continuation of U.S. patent application Ser. No. 16/589,089 filed in the U.S. Patent Office on Sep. 30, 2019, which is a continuation of U.S. patent application Ser. No. 14/457,055 filed in the U.S. Patent Office on Aug. 11, 2014, which issued as U.S. Pat. No. 10,430,750 on Oct. 1, 2019, and which claimed priority to and the benefit of U.S. Provisional Patent Application Ser. No. 61/864,452 filed in the U.S. Patent Office on Aug. 9, 2013, the entire content of these applications being incorporated herein by reference as if fully set forth below in its entirety and for all applicable purposes.

TECHNICAL FIELD

The present invention is in the field of methods for monitoring and controlling shipment using a data logger.

BACKGROUND

One impact of globalization of manufacturing, research and development is the need to coordinate the shipping of materials between multiple sites according to a predefined schedule. In one example, the transport of temperature-stabilized commodities such as research specimens, pharmaceuticals, vaccines, tissue samples, cell-lines, specimens, sera, synthetic or radioactive Commodities, etc., and other synthetics or biologics ("Commodities" or "Contents"), exposes the shipper to risk, uncertainty and high costs particularly when international shipping is involved. When a shipping package or container is in the hands of a shipping company, the shipper cannot easily determine the location and status of the shipment with respect to a planned delivery date, whether the Commodities in the shipping package have been exposed to excessive temperatures, shock, vibration or tilt, and most importantly, whether cold-source within the package such as dry-ice or liquid nitrogen ("Thermal Source"), have an adequate charge remaining to last for the expected (or unexpected) duration of the shipment. Lacking this information, shippers are unable to determine the need for or apply corrective actions while the shipment is in process with the Commodities intact.

In an attempt to mitigate these risks, shippers may place remote telemetry devices within the package to log and sometimes transmit sensor data. Package monitoring devices are generally designed as offline dataloggers where the data is harvested by connecting the datalogger to a computer system through a universal serial bus (USB) connection after the shipment reaches its destination, when it is generally too late to intervene to take corrective actions including replenishment of the Thermal Source during shipment for example.

Shippers of temperature stabilized products such as pharmaceuticals and research Commodities see significant opportunity in new overseas markets. However, shipping Commodities into those markets involves significantly greater risk and higher cost due to longer shipping times, prolonged exposure to shock and vibration and greater potential that the Thermal Source will be dissipated before the shipment is completed. To mitigate these risks, clinical trial research companies over allocate trial experiments to provide a margin of safety so that specimen degradation and drug losses attributable to the shipping process does not cause an insufficiency of clinical trial data. Today, the cost of developing a new drug averages $800 million. Although there is no set rule for the amount of over-allocation, five to 10 percent over-allocation is often mentioned. Taking the more conservative value of five percent, the cost of over allocation and the impact of specimen or drug losses due to risk factors in the cold-chain shipping process, it can be estimated that in a typical clinical trial, $40 million of trial costs could be avoided if risk factors in the shipping process were avoided or mitigated.

SUMMARY OF THE INVENTION

The present invention describes systems, apparatus and methods for monitoring the status and condition of a container using status messages sent from third-party shipping entities and correlating with data received from a data logger while the container is in transit.

In certain aspects, a method for tracking an object in transit includes providing a contact address to a shipping portal operated by a shipper, receiving at least one response message sent by the shipping portal to the contact address. The contact address may uniquely identify an object to be shipped by the shipper. The at least one response message may include shipping information related to the object. The shipping information may be combined with data transmitted by a data logger attached to the object and while the object is being shipped.

In an aspect, the shipping information comprises a tracking identifier generated by the shipper for the object. The contact address includes a unique identifier maintained by, or relating to the data logger.

In an aspect, generating the electronic message includes creating an association between the object and an address that is reserved for tracking shipments, and using the address that is reserved for tracking shipments as the contact address.

In an aspect, the at least one response message includes a current or last-known location of the object. A location of the object may be determined based on the current or last-known location of the object and location information received from the data logger. An arrival time at one or more destinations of the object may be estimated based on the current or last-known location of the object and the data transmitted by the data logger time. The data transmitted by the data logger may include a time of capture of the data transmitted by the data logger.

In an aspect, the data transmitted by the data logger includes information related to a current or recent location of the object. An arrival time at one or more destinations of the object may be estimated based on the information related to the current or recent location of the object. The data transmitted by the data logger may include an outside temperature, a sound frequency, altitude, time-in-transit information, or information identifying absence and/or presence of an identifiable network. The shipping information may identify a custody transfer, a current shipping state, weight information, and/or a shipping route associated with the object.

In an aspect, an itinerary provided in the shipping information may be matched with location-related information transmitted by the data logger. The location-related information may include at least one of a change detected in radio frequency environment, absence of a network, presence of a network, a measurement of pressure, a vibration, an acceleration and/or a tilt.

In an aspect, the contact address may include an electronic mail (Email) address having a configurable portion therein. The Email address may be provided to the shipping portal by programmatically automating an interface to the shipping portal. The Email address may be provided to the shipping portal by programmatically automating a form provided by the shipping portal includes automatically entering the Email address. Programmatically automating the form may include intercepting information transmitted through the shipping portal, modifying the information, and forwarding modified information. Programmatically automating the form may include providing analytics information related to one or more fields of the form. The analytics information may include pricing information corresponding to the shipper, pricing information corresponding to one or more alternative shippers and/or statistical information corresponding to an on-time delivery history of the shipper. The contact address may be an Email address that includes a hash of information that uniquely identifies the object to be shipped.

In certain aspects of the invention, a method for tracking an object in transit includes obtaining an identifier that uniquely identifies a data logger attached to a shipping container, generating an Email address based on the identifier, providing the Email address to a shipping portal while ordering shipment of the shipping container, configuring an Email server to receive messages addressed to the Email address, and combining shipping information extracted from the messages addressed to the Email address with data received from the data logger during shipment of the shipping container. The Email address may have a portion that is derived from the identifier.

In an aspect, the shipping information includes information identifying at least one departure location and at least one destination location or a last known location of the shipping container. Data received from the data logger may include a physical location of the object and a time of capture of the data.

DETAILED DESCRIPTION OF THE INVENTION

Figure 1:
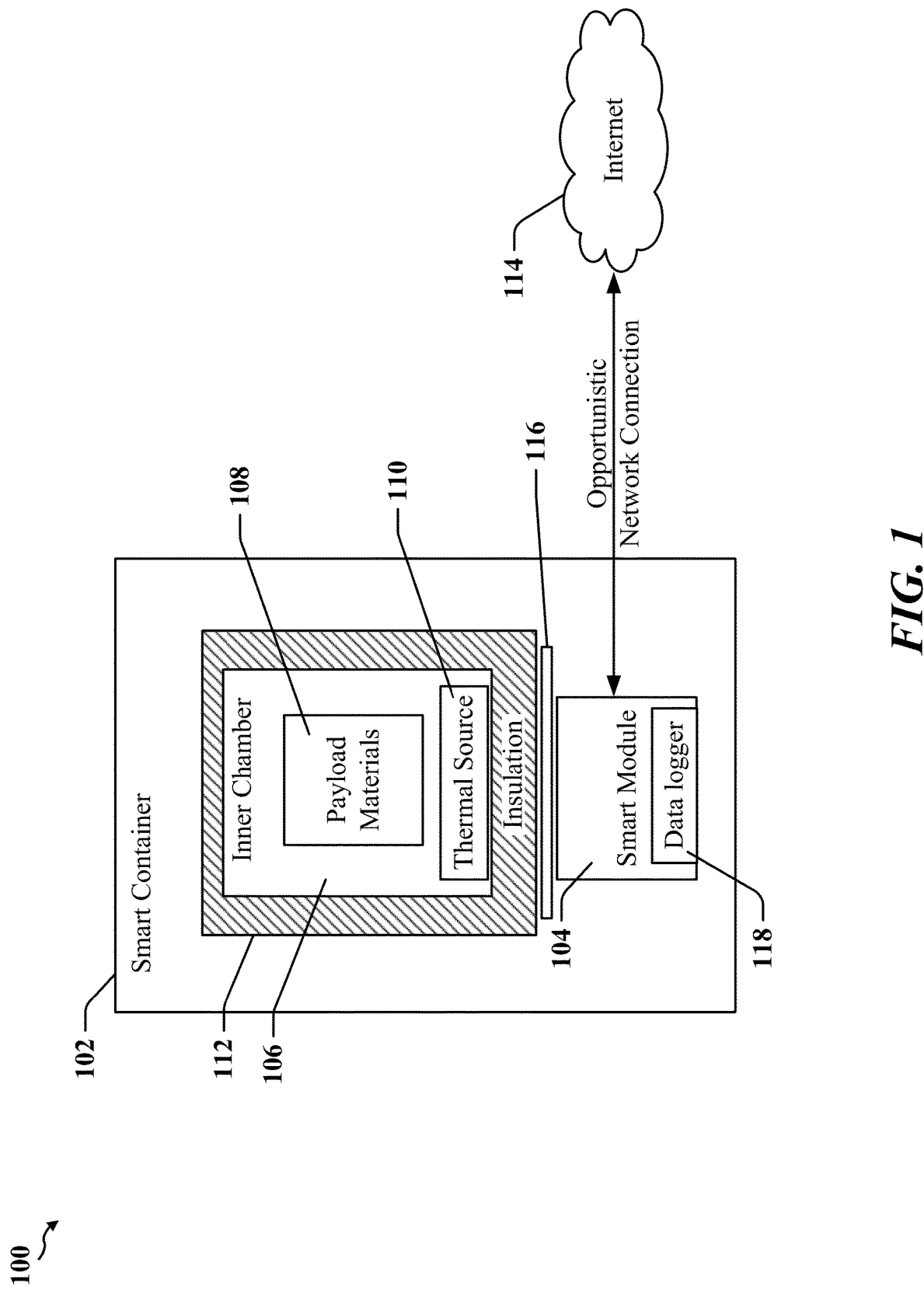
FIG. 1 illustrates a shipping container adapted according to certain aspects of the invention.

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the descriptions herein are intended to encompass other embodiments including a plurality of the same component, and vice-versa, unless explicitly stated otherwise. Moreover, applicants do not intend for any term in the specification or claims to be ascribed an uncommon or special meaning unless explicitly set forth as such. Further, embodiments of the present invention encompass present and future known equivalents to the components referred to herein by way of illustration.

Systems and methods provided in accordance with certain aspects disclosed herein enable a data logger to be tracked and managed using one or more third party tracking systems. In one example, a data acquisition and/or logging device may be attached to an object to be shipped and/or to a shipping container or package used for shipping the object. The object may be shipped using a commercial agent ("Shipper") which may include one or more of a postal service, a commercial shipping service such as FedEx, UPS, DHL and the like, a transport company such as an airline, railway company, a trucking company, a bus company and so on, and/or a courier service. Different third-party Shippers may be used for different legs of the itinerary. As disclosed herein, a tracking system may interact with the data acquisition and/or logging device while in transit and may determine location, progress, and estimated shipping and arrival times using tracking services provided by the third party shippers.

The data acquisition and/or logging device may comprise a separate data-logging device that interacts with a monitoring and communications device (referred to herein as a "Smart Module"). In some embodiments, the Smart Module may be configured or adapted to operate as a data logger. For the purposes of this description, the term "data logger" is used to refer to either a separate data-logging device or a data logging function performed by one or more hardware and/or software components of a Smart Module.

The Smart Module may be configured to collect data associated with an object to be shipped. The data may include information related to external forces such as shock, vibration and tilt observed at the shipping container or to the Commodities contained therein, and environmental conditions surrounding the container such as temperature and pressure experienced by the container during shipment. The data may include location information associated with the container, including one or more locations of the container during shipment that may be determined using one or more of RFID detection, MAC-address association, GPS or RF presence sensing, carrier scan-codes, RF triangulation or trilateralization.

In one example, the data may be used to determine if the remaining life of a Thermal Source associated with a shipping container is sufficient to provide protection until the planned delivery of the container at its destination, with sufficient margin to cover unexpected delays. If it is determined a priori that the remaining life of the Thermal Source is insufficient, the data may be used to trigger an intervention measure to cause the shipment to be intercepted in order to replenish the Thermal Source, before delivery of the shipping container to the final destination or to direct it an alternate destination where the replenishment of the Thermal Mass can be accomplished with less delay. According to certain aspects disclosed herein, information regarding the state of the content of the shipping container, remaining thermal source life, ambient conditions, and other such information may be provided by a Smart Module. The Smart Module may additionally provide an indication of geographic location obtained from a global positioning system ("GPS") receiver, from information received from a local network, or by inference based on detected networks and the like. In some instances, it may be desirable to interrogate a third-party shipping system to obtain information such as a current and/or last know location, and scheduling information such as expected delivery times at one or more destinations or waypoints. A system may be adapted according to certain aspects disclosed herein in order to obtain information from the third-party shipper without establishing a formal application-to-application interface with the third-party shippers tracking system.

FIG. 1 is a block diagram 100 illustrating a smart shipping container 102. For the purposes of this description, a smart shipping container or shipping container 102 (generally and interchangeably referred to herein as "the Shipping Container") may comprise one or more of a package, box or other container utilized for the transport of Commodities and/or specimens 108 or Contents. The Shipping Container 102 may be fitted with a Smart Module 104, a set of one or more transducers to monitor environmental conditions and/or a data logger 118 to monitor environmental conditions and/or the state of the payload. For example, the Shipping Container 102 may include a Thermal Source 110 configured to maintain the temperature of the payload under temperature stabilized conditions and the Smart Module 104 may be equipped to monitor temperature and the expected lifetime of the Thermal Source 110. The Shipping Container 102 may comprise more than one container such as a Dewar, or an inner enclosure 106. The Shipping Container 102 may comprise a single enclosure having an inner space that may be insulated. In certain embodiments, the Shipping Container 102 is adapted or adaptable to carry Commodities such as vaccines, pharmaceuticals, tissue samples, cell-lines, specimens, sera, synthetic or radioactive commodities, etc.

Certain principles described herein apply equally to a Shipping Container 102 that employs an inner enclosure 106 and one that has only and inner space (e.g. a shipping box). The Dewar, inner enclosure 106 and/or inner space may form an insulated or non-insulated containment volume configured to maintain Commodities under temperature stabilized conditions. A Dewar, inner space or inner enclosure 106 may be enclosed by an outer container or shell, which may include a layer of insulation 112. In at least some embodiments, the Shipping Container 102 contains a thermal source 110 constructed from a phase-change material, such as dry ice, gel-packs or liquid nitrogen and Commodities.

In other examples, a less complex shipping container may be instrumented and/or equipped with a Smart Module 104. For example, certain materials may be relatively tolerant of temperature changes and it may be sufficient to track location, maximum and minimum temperatures, attitude of the package during shipment (e.g. when a liquid is shipped), ambient air pressure, vibration and/or detected impacts. In one example, a package may include pressurized containers that may be susceptible to damage if transported in an unpressurized aircraft hold.

In certain embodiments, one or more Smart Modules 104 and/or one or more transducers or sensors may be attached or inserted within and/or on an external surface the Smart Shipping Container 102. The transducers and sensors may be adapted to capture ambient environmental conditions such as temperature, altitude, air pressure, presence of vibration or audible sounds, humidity, etc. One or more transducers and/or sensors may be adapted to determine orientation, attitude, velocity, altitude, etc. In one example, a global positioning system ("GPS") device may be provided. In another example, the Commodities of the Smart Shipping Container 102, comprising the Thermal Source 110, Commodities and/or specimens 108, and the Smart Module 104 may be co-located within the Smart Shipping Container 102 such that the Commodities rest upon a plate 116 or bladder (not shown) allowing the weight of the Commodities to be measured by means of a transducer coupled to the plate 116 or from a measurement of pressure within the Bladder.

The Smart Module 104 may be configured to communicate opportunistically with a network 114 such as the Internet or to another network that may be accessed through a mobile access point, which may be attached to or carried by a person, animal or vehicle for example. The Smart Module 104 may be configured to use a proprietary communications protocol and/or a standards-defined communications protocol, including protocols that employ or are compatible with the Internet protocol ("IP"). The data logger may record data over the period of time during which a shipping object is in transit between an originating location and a destination location, including data collected at intermediate points of the shipping itinerary. The data logger may be implemented by the smart module described herein and/or may interface with the smart module. The data logger may record environmental, location, information related to state or motion and/or attitude of the shipping object. The data logger may be configured to acquire and/or process measurements obtained by instruments and sensors that are collocated or integrated with the data logger or smart module.

Figure 2:
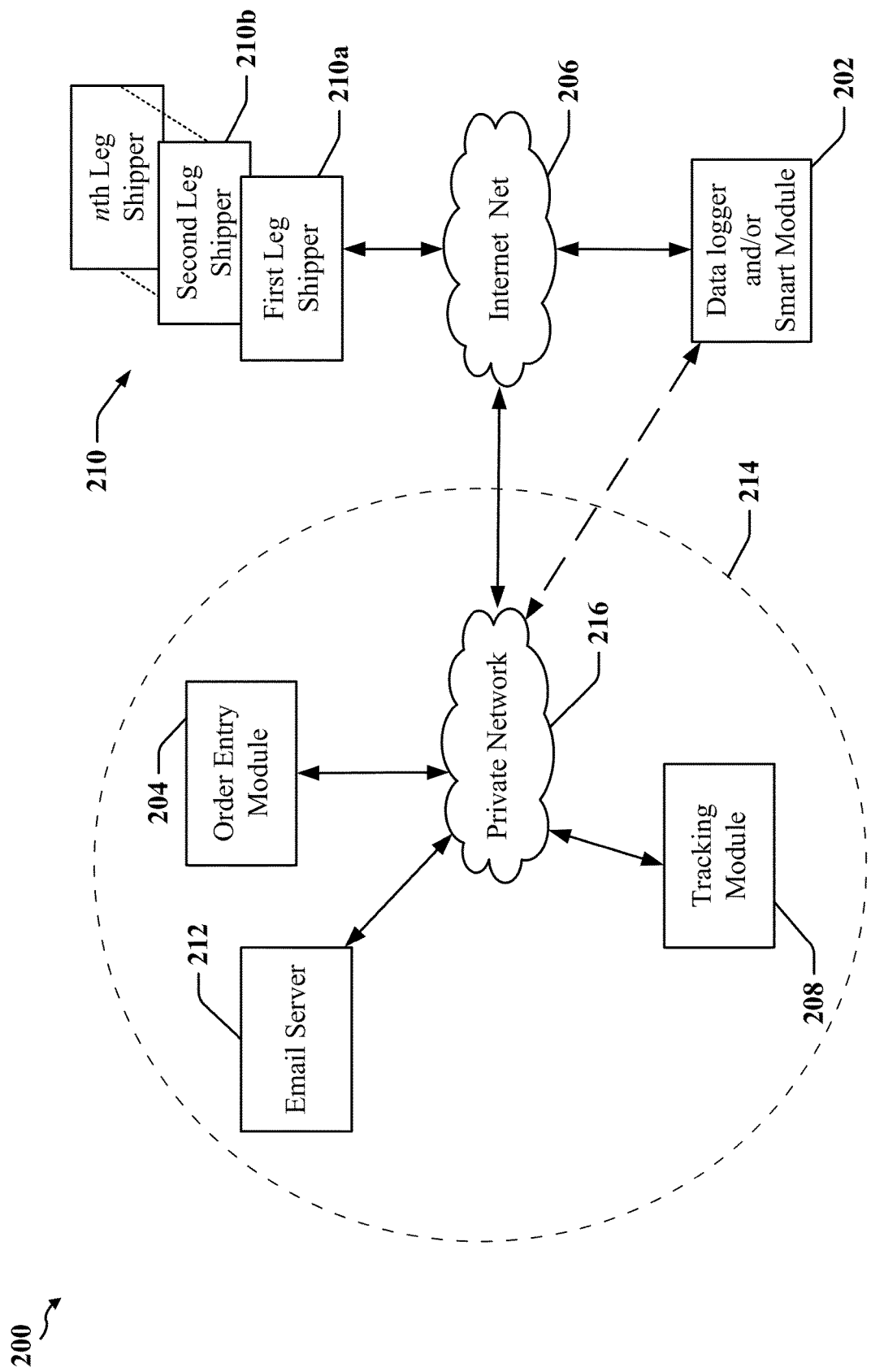
FIG. 2 illustrates system independent data entry and data logging according to certain aspects of the invention.

FIG. 2 is a simplified block schematic 200 illustrating certain aspects of order-entry and tracking associated with a shipment. Order-entry and tracking may be controlled and managed through one or more third-party portals to systems operated by Shippers 210 and/or a system that comprises one or more Shipper-independent order-entry modules 204 and/or Shipper-independent tracking modules 208, which may be used to plan a shipping itinerary for an object to be shipped and to monitor progress relative to a desired itinerary. Tracking systems operated by multiple third-party Shippers 210 may be used to track an object over an entire itinerary or for selected portions of the itinerary handled by one or more Shippers 210. Access to tracking systems operated by a Shipper 210 may be made available to the person or entity requesting shipment and access may be obtained on-line through a computing device by means of the Internet 206 or another network. In one example, the shipping requester may access a tracking system through a web portal operated by a Shipper 210 and/or may receive information such as updates through Email, a small-message service (SMS) message, a social networking application, a voice-over IP ("VoIP")-based communications application, and/or other application or messaging system.

In one example, an itinerary may be generated when a user contacts a system or systems operated by one or more Shippers 210 directly or through an intermediate or proxy system. The user may request shipment by accessing an order entry system through a web portal operated by one or more of the Shippers 210. In some instances, a first Shipper 210a may provide scheduling services for a second Shipper 210b where, for example, the first Shipper 210a specializes or provides air shipping services and the second Shipper 210b provides local ground shipment services. The user requesting shipment may be a person or an entity who may directly access the portal or may use an order entry module 204 or system to request shipment between two or more locations. Upon completion of a shipping request, the user or order entry module 204 may receive shipping information one or more confirmation numbers, package numbers, tracking numbers or other identification from the portal. The shipping information may enable access to information related to the shipment before, during and/or after shipment. The person or entity requesting shipment may use the shipment information, including a shipment identification, to register for notifications, status reports and other information related to the shipment between two the locations in an itinerary that are handled by the shipper. The shipment information may be used to register directly a portal operated by the Shipper 210 in order to request current status, estimated delivery dates, current location and/or other information related to the shipment. Some shipments may involve more than one Shipper 210 and the person or entity who requests shipment may receive multiple tracking numbers and shipment identifiers for the entire itinerary.

In certain embodiments, a system having order entry modules 204 and tracking modules 208 is provided that allows the person or entity requesting shipment to automatically track a shipped item and to interact with a smart module 202 associated with the shipped item while the item is in transit. In some examples, the system is configured to provide the person or entity requesting shipment with an experience that appears to be consistent with an interaction with a single system that provides both shipping information and monitoring information from a data logger 202. According to certain aspects disclosed herein, the tracking information provided by a third-party Shipper 210 may enable the presently disclosed tracking system to accurately associate information accumulated by the data logger with physical locations along the path of shipment based on receipt of shipping information sent by the third-party Shipper 210. The tracking information provided by a third-party Shipper 210 may facilitate communications between the presently disclosed tracking system and the smart module 202. In one example, the tracking information provided by a third-party Shipper 210 may be used to stage information intended for the smart module 202 at a nearby opportunistic network access point.

In certain embodiments, an order-entry module 204 receives a desired shipment plan from the person or entity requesting shipment and may determine a set of Shippers 210 and itineraries to implement the shipping plan. In some embodiments, the order-entry module 204 may receive identification of a Shipper 210, tracking numbers and other relevant information from the person or entity requesting shipment and may model or reconstruct the itinerary based on this and other information. The order-entry module 204 may also be configured to request that notifications, shipment updates and other tracking information be provided by one or more third-party tracking systems to the tracking module 208. The tracking module 208 may receive the notifications, shipment updates and other tracking information through a proxy identified by an electronic messaging address and/or domain.

In one example, an electronic mail ("Email") server 212 may be configured to generate unique Email addresses for each shipment tracked. The unique Email address may include an identifier of the shipment and a domain name. A shipment may be assigned an Email address of "<ShipmentID>@klatutrack.com" that may be associated with a specific data logger 202, for example. The order-entry system may request that notifications, shipment updates and other tracking information for the shipment be sent to the "<ShipmentID>@klatutrack.com" address. An Email server 212 that receives Email for the klatutrack.com domain 214 may be configured to identify the shipped item from information embedded in the Email address and to provide updates and notifications by Email to the tracking module 208. For example, the Email account identifier "<ShipmentID>" may be automatically generated and may comprise an encrypted hash containing a unique identifier associated with the transmitter. The unique identifier of the transmitter may comprise one or more of a media access control ("MAC") address, a customer identifier, an air bill number, etc. When information specific to the shipment is used, such information may be extracted from an Email notification sent by a carrier. This information may serve as a means to associate the Smart Data Module 202 with a third party Shipper 210 and an object being shipped within the Shipper's system.

In another example, the shipment may be assigned an Email address where the shipment is identifiable from the domain name.

In another example, a user may provide a plurality of reserved Email addresses, where each shipment can be assigned a reserved address for the duration of the shipping activity. The order-entry system may request that notifications, shipment updates and other tracking information for the shipment be sent to the reserved Email address associated with the shipment. For example, a system according to certain aspects disclosed herein may enable an entity such as Acme Widgets LLC to track a thousand shipments by reserving a set of Email addresses for tracking shipments, where the reserved Email address may have the form "ship_xyz@acmewidgets.com," where "xyz" is a number that can range from 000 to 999.

In certain embodiments, interaction with a Shipper 210 or other third party data entry system may be automated. In one example, a tracking module 208 may be configured to interface directly with a portal operated by a Shipper 210 and may associate a reserved Email address or other messaging address with a shipment, where the reserved address is used to receive delivery of shipping information and updates from one or more Shippers 210. In another example, a tracking module 208 may be configured to interface directly with the web application provided by the Shipper 210 for the purposes of providing access to its order entry system. The tracking module 208 may populate information fields in system provided by a Shipper 210 by providing a tracking Email address or other messaging address that is used for delivery of shipping information and updates. In some instances, the smart module 202 may provide an identifier to the tracking module 208 through a network when a switch, button or other control or control sequence is activated. In some instances, a near-field communications (NFC) tag associated with a shipment may be configured to respond to a reader to provide an identification that can be employed by the tracking module 208 or third-party portal. In some instances, barcodes may be used to transfer information identifying one or more of the shipment, the Smart Container 102, the smart module 202, the customer, or another component or entity, and/or an Email address to be used for notifications by the third-party Shipper. Such barcodes may be presented to a smart module 202, Shipper portal, tracking module, or the like.

The tracking module 208 may process received Email or other messages to extract a number of different types of information. The tracking module 208 may parse a payload of the Email or message to confirm presence of a relevant tracking number and to identify the purpose of the Email or message. Information extracted from the Email or message may indicate that an item has left the starting location or an intermediate location and/or has arrived at an intermediate location or at a destination. Other information extracted from the email by the tracking module 208 may include shipment origin and delivery address, delivery date, estimated delivery date, revised delivery date, travel history, weight, Shipper 210 Invoice, package dimensions, service level, shipper reference information, special handling, commodity codes and shipment exception information such as a shipping delay. The tracking module 208 may also be configured to determine when an arrival or departure is expected for a shipped item and may initiate a response when arrival or departure has failed to occur at the expected time or after a predetermined maximum delay.

In certain embodiments, the tracking module 208 may be configured to request that a tracking system provide updates related to the shipment and to receive and process such updates. In some embodiments, the tracking system is configured to automatically generate updates related to the shipment, which may be received by, or forwarded to the tracking module. The updates may be directed to an electronic address such as an Email address.

In certain embodiments, systems, apparatus and methods may be adapted or configured to implement certain features of the invention, including the features described above. According to certain aspects of the invention, shipment order processing may be simplified and accelerated. Shipment tracking, tracing, and shipment content monitoring may be integrated through a single portal, which may be provided as a web-based service or through a browser, plug-in or other application. In one example, monitoring of the state-of-health of a commodity may be integrated into what appears to a customer to be a single web-based application. As a result, shipment order processing costs, commodity losses due to insufficient package may be reduced, while overheads associated with commodity tracking, tracing and monitoring can be decreased.

Figure 3:
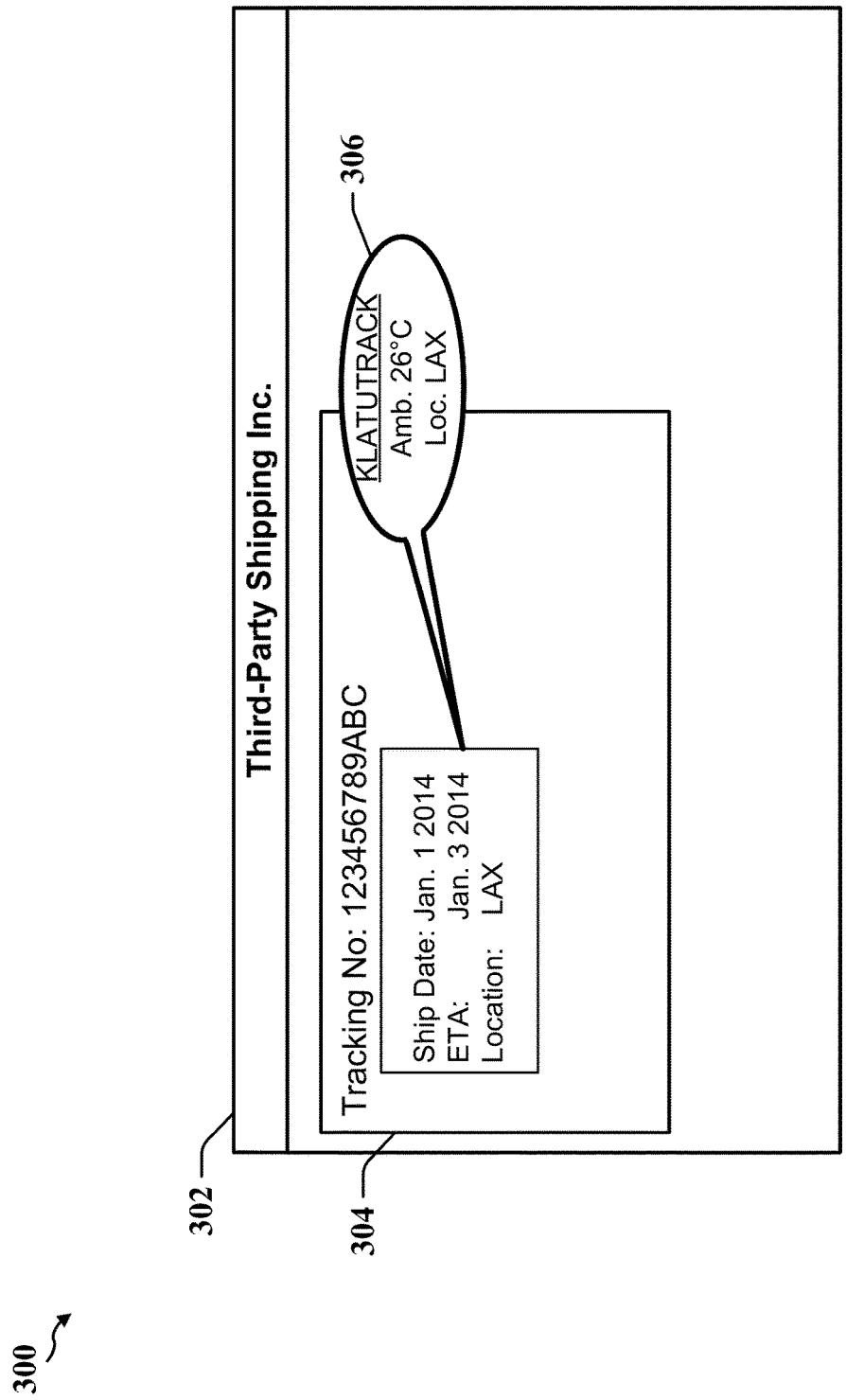
FIG. 3 illustrates a simplified view of a portal that may be adapted for system independent data entry and data logging according to certain aspects of the invention.

FIG. 3 is a simplified illustration of the operation of an enhanced web-based portal 300 according to certain aspects disclosed herein. In the example, a portal may be accessed through a web browser 302 that displays information provided by the third-party Shipper through its portal. For example, a user may enter a tracking number and may be provided with tracking information 304. In certain embodiments, one or more browser extensions, plug-ins and/or other enhancements (collectively, "Helpers") may attach context sensitive tool-bars and floating dialog boxes 306 to the information provided by a web-based order entry application operated by a Shipper 210 or other provider. In some instances, the Helpers may inject information into fields already existing within a web form provided by the Shipper 210, and/or into rendered fields 306 that are added to the web form. In some instances, the information provided by the Shipper 210 may be handled by an applet or script executed on a user device. Additional information may be displayed through manipulation or enhancement of the applets. In the example, the floating dialog 306 may be used to display information that is retrieved directly from a Smart Module or otherwise independently of the Shipper 210.

More sophisticated Helpers may be integrated with cloud-hosted services to provide business process optimization features and analytical services, which further automate or optimize the shipping process. Accordingly, an additional set of tools and interfaces may be integrated seamlessly with an order processing system operated by or on behalf of a Shipper 210. In one example, the tools may include tools that augment order-entry processes and tools that provide improved package and commodity tracking and monitoring. In some embodiments, a customer using a portal according to certain aspects disclosed herein, need not directly or indirectly rely on a system operated by a third-party vendor or a Shipper 210 in order to add a sensor package to the shipping order, or to view information about the status of the shipment and Commodities as determined by tracking and monitoring devices installed and/or managed without the cooperation and/or knowledge of the third party. For example, a smart module 202, 104 and/or data logger 118 may be added to a package prior to shipment, such that communication with the smart module 202, 104 and/or data logger 118 while in transit does not rely on services and networks operated by the Shipper 210.

In some embodiments, shipping and package monitoring information may be presented in a manner consistent with the appearance and operation of a third-party application or web page. For example, information may be presented directly within the Shipper's web form, within floating dialog boxes 306 placed within, or as an extension of the customer's browser, such that information appears to be integrated with the third-party shipping application. In some embodiments, information may be presented in floating dialog boxes 306 that may be superimposed on a displayed web form, typically in proximity to relevant items of the web form. In some embodiments, information may be presented at least partially external to the third-party web form. In some embodiments, the behavior of dialog boxes 306 may be configured by a user, including by a customer or agent of the customer. In one example, a floating dialog box 306 may be used to pre-populate one or more fields automatically including, for example, user identification fields, address and billing information, and/or information identifying or associating a contact address for receiving shipping information from a Shipper portal. In some instances, a plug-in may know, a priori, the unique identifier of a data logger that is associated with an email address provided as the contact address.

In some embodiments of the invention, customer business information that is entered during the shipment order entry process, or which may be determined from shipment confirmation notices, is captured and stored for analysis. Data mining may be performed on the customer's information to detect useful trends, anomalous events, overcharges and other valuable business information. Such analysis may include benchmarking and other metrics pertaining to the Shipper's performance, which may be derived by aggregating and analyzing certain shipping and monitoring data from all customers such as on-time delivery, condition and environmental stability of Commodities upon reaching its destination, price information and the like. This context sensitive information may be offered to subscribers, typically in one or more website-accessible reports. In some embodiments, context sensitive information may be provided within floating dialog boxes or toolbars that attach to the customers browser during the shipment ordering process, and/or while using the Shipper's web application.

Cloud-based monitoring, tracking and analytics applications may provide real-time support for Helpers. In one example, cloud-based applications can populate fields on the third-party web form based upon, or acting upon information or intermediate calculations that might not be known to or accessible by the third-party's order processing application. Thus, processes of shipment order entry employing the third-party web form may be programmatically automated. Additionally, high-value information may be presented that is otherwise not provided or made available by the third-party application. For example, a customer may be informed that the destination address has a low on-time delivery score for the scheduled delivery date, or the existence of a possible delivery delay due to a Shipper alert affecting the destination address, or a lower shipping cost available from an alternate Shipper on that particular day and shipping lane, or for an earlier or later day.

Order Entry to Third Party Systems

By way of example, a shipping process is now described. Typically, the first step in the shipping process is for a customer to initiate one or more shipments from one or more customer origin points to one or more customer destinations. In its simplest form, a customer can initiate a single order of one shipping package from a single customer origin point to a single customer destination. For example, the customer might be a clinical site that is shipping a patient sample to a lab for testing. Upon initiation of an order, the customer identifies itself and the customer origin point (e.g., a location where the patient sample was obtained and stored awaiting shipment) as well as the location of the lab where the patient sample is to be sent.

When a customer initiates an order certain information is obtained from the customer. This information can include what is to be shipped, the amount of material that is to be shipped, where it will be shipped (as there may be more than one location where material needs to be shipped), the date and time the material will be ready for shipment, an acceptable temperature range at which the material is to be maintained at all times during shipment, and other information that may be needed to comply with customs or other regulations. During the order process software will check to insure that any required shipping containers needed to fulfill the order will be available for the requested shipment date and time and begin the process of managing all shipments needed to fulfill the customer order and return any shipping containers to a repurposing site so that they can be reused. (If required shipping containers are not available, the customer may be prompted to try a different requested shipment date.)

Once a customer order is confirmed and it is confirmed that any shipping container needed to fill the customer order is available, the steps necessary to fulfill the order are initiated. These steps can be broken down broadly into preparing an itinerary of all required shipment legs and placing shipping orders for each shipment leg, preparing any shipping container needed to fill the customer order and shipping it to the customer origin point and tracking the entire shipping process.

Creating an itinerary of necessary shipments allows progress of the shipping container to be tracked and monitored against projected shipping times to help ensure that the shipping container reaches the customer destination while the sample chamber in the shipping container is still being maintained at a temperature below a desired maximum temperature or within an acceptable temperature range. This is especially important because a shipping container charged with a cryogen has a limited lifespan before the cryogen ceases to maintain its sample chamber at a temperature below its desired maximum temperature. Because the itinerary is created before the shipping container reaches the customer origin point, the time needed for each shipping leg can be shortened and the limited lifespan of the cryogen can be maximized by maximizing the efficiency of the various shipments.

For example, once a customer order is placed, and the customer origin point and the date and time the customer's material will be ready for shipment are known, charging of the shipping container with its cryogen (liquid nitrogen) can be timed so that such charging takes place as close as possible to the time when the shipping container will be picked up for shipping by the shipper to the customer origin point as close as possible to the date and time the customer's material will be ready for shipment. When the shipping container arrives at the customer origin point, the customer should already be aware of the anticipated arrival time of the shipping container and be prepared to load the customer's temperature stabilized material into the sample chamber of the shipping container and then return the loaded shipping container to a shipper for its next shipping leg. Again, since the time for such activity has already been calculated and anticipated, the order for picking up the shipper has already been placed (and verified), and once the loaded shipping container is picked up at the customer origin point, all that remains is for the shipment to be made to the customer destination according to the order for this shipping leg that was calculated as part of the initial itinerary. Alternatively, the order for picking up the shipper can be placed once delivery to the customer origin point is confirmed.

When the various shipping legs go according to schedule, there should be no problem in delivering the customer's temperature stabilized material to the customer destination in accordance with the initial itinerary developed when the customer order is accepted. Also, because of the advance planning that goes into the itinerary, downtimes between shipping events are minimized, which means that there is greater room for error if something does not go according to schedule. Thus, rather than waiting a day or more between delivery of the shipping container to the customer origin point and its pickup, both events can conceivably be done the same day with an appropriate amount of time between them for loading the sample chamber.

In order for the various shipping legs to be done most efficiently, the initial shipping leg to the customer origin point is carefully controlled. Ideally, as already noted, this initial shipping leg is timed so that a shipping container is delivered to the customer origin point with a minimum amount of delay between the time that the shipping container is charged with a cryogen and the time that the shipping container arrives at the customer origin point. In addition, steps can be taken to simplify, speed up and ensure the accuracy of the later shipping legs by pre-printing labels for use on each shipping leg so that no additional shipping labels need to be filled out and so that no errors can be introduced into the shipping process due to incorrect entry of shipping information on a shipping label.

Shipment Tracking

Tracking of the shipping container allows problems in the shipping process to be identified when they arise and, if necessary, steps can be taken to solve such problems. In this sense, tracking of the location of the shipping container can be used to measure the "health" of the shipping container and its sample chamber according to at least one preselected criterion. For example, a variation in a planned itinerary may occur when a shipping container is not picked up as scheduled. For example, an itinerary for a customer order may provide that a shipping container is to be delivered to a customer origin point by 10 a.m. on a given day and it is then to be picked up at the same location at 3 p.m. the same day, but the shipping container is not picked up as scheduled. When the time for pickup has passed, and there is no confirmation of the pickup, and the shipping container is tracked as still being located at the customer origin point, a new order can be placed for pickup of the shipping container at the customer origin point at a later date and time and any subsequent shipping legs in the order itinerary can be automatically adjusted at the same time by a software itinerary program having access to available shipping information. The new order can be placed automatically or after the reason for deviation from the itinerary has been investigated and it has been determined that the delay will not adversely affect shipment within a new itinerary timeframe for the customer order. Repeated delays in shipment may result in a conclusion that shipment cannot be made within a new itinerary timeframe for the customer order without adversely affecting the sample because the cryogen in the shipping container does not have sufficient useful life left to ensure the temperature of the sample chamber remains below its desired maximum temperature. At this point there are three options for dealing with the problem caused by the delay. The order can be cancelled in its entirety (which may be better than losing the temperature stabilized shipment during shipment due to excessive heat in the sample chamber). Alternatively, new cryogen can be added to the shipping container or a new shipping container can be delivered to the customer origin point for use in filling the customer order under a revised itinerary tied to the useful life of the replacement shipping container. Whichever alternative is chosen, the delay may not result in damage to the temperature stabilized material during shipping because such material did not leave the customer origin point in a shipping container that would not be able to maintain the temperature of such material below a desired maximum temperature during shipment to the customer destination.

Rather than a delay in pickup at the customer origin point, other delays may occur during shipment after pickup at the customer origin point. For example, the shipping container may be shipped to an improper destination by the shipper or diverted to another location by a regulatory authority, or delay may be caused by unforeseen circumstances, customs authorities or some other regulatory authority. As long as the delay can be detected through knowledge of the location of the shipping container at a given point in time, appropriate steps can be taken, if need be, to deal with such delay. For example, if the shipping container has been misdirected or diverted, an order can be placed for a new shipping leg from the point where the shipping container is now located to the correct destination. When the delay occurred at the customer origin point, arrangements may be taken to have new cryogen added to the shipping container or a new shipping container could be delivered to where the shipping container is located due to delay (for example, waiting to clear customs) so that the temperature stabilized material can be transferred to the replacement shipping container with a longer useful life that will allow the temperature stabilized material to reach the customer destination without damage caused by excessive temperature.

In certain embodiments, tracking is accomplished through the use of a Smart Module 104 and/or data logger 118 coupled to the Smart Module 104 (see FIG. 1). The Smart Module 104 may be uniquely identified with the shipping container and the customer order and can be readily tracked by computer tracking software as its location is detected. Although the location of the sensor might be monitored on a continuous basis during some or all of the shipping process, it need not necessarily be monitored on a continuous basis, so long as it is monitored during key points of the shipping process. A data logger 118 may enable collection of a wide variety of information related to the shipment An opportunistic wireless tracking system may be employed to track and communicate with the Smart Module. For example, there are many locations that provide accessible WiFi coverage that are located along many routes where a Shipper delivery truck could be expected to travel, an example of which may be Starbucks® stores. If the wireless location sensor is designed to opportunistically utilize such WiFi hotspots to send its location via the Internet to a central tracking program, interim movement of the shipping container can be tracked and, when such movement is coupled with fixed point detection centers, such as at the customer origin point and destinations, and central warehousing facilities, a good picture of shipping container's location can be obtained, keeping in mind that continuous and instantaneous tracking is not required to accomplish the goals of the shipping methods set forth herein.

Because tracking of the location of the shipping container allows the shipping progress to be documented and monitored real time by a computer, it can also provide a mechanism for establishing reasons for any delays that are incurred in the shipping process and, if necessary, allocating any liability associated with such delays.

In certain embodiments, a data logger 118 is provided with the shipping container to monitor and periodically record temperature in the shipping container during transit. The data logger can be accessed and a data log removed during shipment of the shipping container and/or once the shipping container is returned to reprocessing facility. Such information may be used in dealing with issues relating to liability that might arise if a specimen is damaged during shipment, or in settling questions relating to whether any such damage did in fact occur during shipment.

In order to monitor the temperature of the sample chamber of the shipping container the sample chamber itself can be monitored or the temperature in the sample chamber can be monitored by use of a proxy calculation based upon a temperature reading taken outside of the sample chamber. For example, if the temperature reading is taken in the neck tube, a simple calculation can be used to calculate what the actual temperature in the sample chamber will be based upon the distance between the sample chamber and the location of the temperature sensor in the neck tube. In one example, a wireless temperature sensor is combined with a wireless location sensor that provided location data together with temperature data in the data log.

When a temperature sensor is included in the shipping container it can also be used to trigger an alert if a rise in temperature is detected or if the temperature in the sample chamber goes above a preselected threshold temperature or outside a preselected temperature range. This function is one way in which the "health" of the shipping container can be monitored and tracked, especially if it is combined with a location of the shipping container, since the periodic location of the shipping container itself at a given time interval can be used to determine the periodic health of the sample chamber according to at least one preselected criterion such as, for example, anticipated remaining time required for the shipping container to reach a customer destination. An alert can also be generated upon detection of a trend predicting that the temperature in the sample chamber will exceed a preselected threshold temperature within a predetermined time.

In certain embodiments, the presently disclosed shipping and tracking methods may be applicable to a single customer origin point ships to a single customer destination and multiple customer origin points and/or customer destinations. The number of shipping legs may be limited by the time required to complete shipment and the ability of the shipment container to maintain the health of its Commodities.

Certain embodiments of the invention provide systems and methods for tracking objects in motion and/or transit. In some of these embodiments, the object comprises a shipping container. In some of these embodiments, the object comprises a vehicle that transports products and materials. Typically, the object encounters networks at various points while in transit. The object may be interrogated by devices connected to the network upon establishment of connection between the object and the network. In some embodiments, the object may also proactively transmit information through the network upon determining presence of a suitable network and negotiating a connection with the network. The object may transmit information using standard and proprietary network protocols in a connection-based or connectionless mode of operation. The object may use telecommunication networks to send, for example, short messages and/or units of data.

In some of these embodiments, the object comprises an environmentally stabilized container. For example, a temperature-stabilized chamber may be provided within the container. Temperature may be stabilized by any combination of electrothermal, electrochemical and/or electromechanical means. In some embodiments, liquid nitrogen may be used to maintain a desired temperature of the chamber.

Certain embodiments comprise systems and methods for monitoring remaining cooling capacity of the container. Remaining cooling capacity can be calculated based on battery charge, available liquid nitrogen, ambient temperature and other factors. In some of these embodiments, remaining life can also include an assessment of one or more of the following: the amount of time a container, flask and/or Dewar is in a tilted orientation, the amount of shock and acceleration to which the object and/or container is exposed, ambient temperatures, the weight of the object, volume of the chamber, Commodities of the chamber and estimates of these factors. In some of these embodiments, a visual indication of the condition and remaining life may be displayed on the object.

Certain embodiments of the invention provide systems and methods for operating an environmentally stabilized chamber. The object may include a processing device or a machine readable storage device that enables a processor to maintain and receive pre-programmed instructions determining power control associated with the object. In some of these embodiments, on/off times may be specified that anticipate future availability of opportunistic network connections. In some of these embodiments, requirements may be specified that determine when to record a sensor parameter. The instructions may be generated based on a comparison of observed data compared to an analysis of historical information gathered by other monitoring devices traversing a similar route to the object in transit. The route may lie between cities, states and countries. The route may equally lie between points in a building.

In some of these embodiments, a control device provided in the object can decide when the device must not transmit, e.g. when aboard an airplane. In some of these embodiments, on/off determination is accomplished by means of an analysis of elapsed time, location (see location), in response to monitored sensor inputs (temp, altitude, vibration, vibration, RF frequency detection (speech, jet engines, machinery etc.), exposure to magnetic fields, orientation, presence or absence of (i) light or lighting with detectable characteristics (i.e. Kelvin), or absence thereof, and (ii) by external commands provided via magnetic, infrared or RF communications, or the detection of certain RF frequencies or determination of certain network address.

In some of these embodiments, location of the object may be determined at various points during transit. A monitoring system may determine or infer the location of an object by correlating identifiable information in a wireless emission or transmission (RF, infrared, magnetic etc.), which has a known and previously determined location. This may be accomplished by means of a single received transmission and/or by a series of related and/or unrelated emissions and/or transmissions. A monitoring system may further determine or infer the location of an object by correlating scan code information provided by handlers of the object or by third parties. Scan code information typically comprises actual location information or location identifications made by inference or deduction from scan code information and/or the fusion of scan code information with other sensor or network information.

In some of these embodiments, a monitoring system may determine or infer the location of an object using a global positioning system (GPS), by RFID "readers" at pre-positioned "choke points" and/or by cellular network triangulation. In some of these embodiments, a monitoring system may determine or infer the location of an object within a building or finite area by means of an analysis of Received Signal Strength Indications (RSSI) or Time Differential of Arrival (TDOA) from one or more transceivers.

In some of these embodiments, a monitoring system may determine or infer the location of an object using an estimate of where the object should be based on the time elapsed since the object departed its point of origin. In some of these embodiments, a monitoring system may determine or infer the location of an object by observing the number of "hops" and duration of each hop, in a shipment as defined by a barometer detecting ascension to altitude.

In some of these embodiments, data can be collected from a plurality of objects in transit using one or more networks. The process of information gathering or data harvesting from these objects will be referred to here as "data backhaul." Data may be harvested by means of a continuous wireless network (WLAN) connection such as GPRS or WiMAX, for example and/or through purpose-built data collection agents placed in third party (e.g. customer or partner) locations and at strategic "choke-points" along the route of a shipping lane.

In some of these embodiments, data may be harvested by means of opportunistic network connections. Opportunistic harvesting may occur (i) when the object senses the availability of a temporary or transient LAN or PAN agents at any time during their journey, (ii) when two or more objects exchange information among each other (ad-hoc) such that the first object that reaches a network connection uploads information from all other objects it encountered in its journey, and (iii) through mobile data collection agents which come in proximity to an object. Mobile data collection agents may be purposefully mounted on a vehicle or worn by a person or animal.

Certain embodiments of the invention provide a portal for monitoring, tracking and controlling objects in transit. The portal may be deployed in a network "cloud" such that available computing resources can be quickly scaled for performance or deployed in a geographically diverse manner for reliability. The portal may be designed for load balancing and fault-recovery such that a failing server is removed from service and the remaining "twin" assumes 100% of the processing load until service can be restored. Certain portals may provide real-time monitoring of system internals, and services to detect any stoppage of the system and alarm notification upon such detection. In some of these embodiments, a wizard is provided to assist with data entry: in-grid editing may be provided to simplify data entry and validation of information on a per-field instead of a per-form basis.

In some of these embodiments, automatic generation of customs and regulatory documentation that will accompany the shipment can be provided, thereby eliminating the need for the customer to prepare such documentation in connection with complex shipments. Some of these embodiments comprise programmatic creation of a "Shipping Plan" which contains all of the necessary steps and shipping procedures to complete the order, essentially constructing a workflow model or required steps to completion. Some of these embodiments comprise methods for analyzing scan codes to determine if a shipment is progressing according to the dates and milestones expected by the shipping plan. Some of these embodiments comprise "learning" features which can operate by means of analysis of scan codes over time so as to "profile" a shipping lane and comparing actual versus expected shipping activities and details.

Some of these embodiments provide a system that is capable of to programmatically re-issuing repeat orders in response to data entry selections. Moreover, the system may be capable of programmatically generating an invoice to the customer or business partner, for all services covering all legs contained within a single order.

Some of these embodiments provide exception handling and management. Exception analysis is a continuous process of statistically calculating or analyzing observed sensor readings, locations and scan codes over time so as to construct a learned "profile" of the shipping lane that represents the typical, mean, average, best or worst conditions observed of the lane as measured by time, sensor readings, network information and location. The system can programmatically infer that a shipping anomaly has occurred based on comparing observed data with historical profiles, and internal "rules" are applied to the observed versus expected information to determine if an exception has occurred and if human intervention is required.

In some embodiments, exceptions can be inferred when any data received from the device or vendor system is believed to be un-correlated with respect to expected values as determined by prior analysis and inferences derived from similar shipments, over identical or similar routes, with like objects and their Commodities.

Certain embodiments of the invention provide systems and methods for tracking objects in transit. Some embodiments comprise measuring at least one environmental condition experienced by an object in transit. Some of these embodiments comprise detecting the presence of an adjacent network accessible by the object. Some embodiments comprise transmitting information associated with the object through the network in response to detecting an adjacent network. In some of these embodiments, the transmitted information includes an object identification and a history of measurements of the environmental condition.

In some of these embodiments, the step of detecting is performed after the object is moved from a first location to a second location. Some of these embodiments comprise determining that the object has been moved based on a loss of connection with the adjacent network. Some of these embodiments comprise identifying the physical location of the object, wherein the step of transmitting information includes transmitting an identification of the physical location. Some of these embodiments comprise identifying the physical location of the object is based on information maintained by a component in the adjacent network. In some of these embodiments, identifying the physical location of the object is performed by a tracking device attached to the object. In some of these embodiments, the step of transmitting information is performed by the tracking device. In some of these embodiments, the tracking device includes a wireless sensor configured to perform the detecting step.

In some of these embodiments, the object is a shipping container comprising a temperature-stabilized chamber accessed through an opening and wherein the tracking device is attached to a plug that seals the opening. In some of these embodiments, the object is a shipping container comprising a temperature-stabilized chamber accessed through an opening and wherein the tracking device is attached to a plug that seals the opening. In some of these embodiments, the at least one environmental condition includes a measured temperature within the temperature stabilized chamber and the measured temperature is determined by a sensor that protrudes from a bottom surface of the plug a predetermined distance into the chamber. In some of these embodiments, the at least one environmental condition includes a plurality of temperatures within the temperature stabilized chamber, wherein at least some of the plurality of temperatures are calculated based on the measured temperature and a table of temperature gradients.

In some of these embodiments, the history of measurements comprises measurements obtained at a selected sample rate. Some of these embodiments comprise comparing the history of measurements with a set of expected measurements, wherein the history of measurements. Some of these embodiments comprise generating an alarm when the history measurements deviate from the expected measurements by more than a maximum tolerance value. In some of these embodiments, the sample rate is adjusted based on the time separation of corresponding expected measurements.

In some of these embodiments, the weight of the object is determined by a sensor mounted in an engineered cavity in the bottom of the container so as to provide a stable weight measurement when the box is not seated in an upright orientation. In some of these embodiments, the weight of the object is used to calculate remaining amount of refrigerant and the useful life of the cold storage remaining. In some of these embodiments, the weight of the Dewar is determined from automated scan code information received from a shipping company, and the remaining life of the Dewar is calculated accordingly.

Some of these embodiments comprise electronics and sensors attached or integrated into a monitoring device. In some of these embodiments, the at least some of the electronics and sensors are encapsulated into a plug that fits into the neck of a chamber (e.g. of a Dewar). In some of these embodiments, a temperature sensor protrudes a short distance from the bottom of the plug into a space cavity above the Commodities of the chamber. In some of these embodiments, temperature of the Commodities is determined with reference to a table of gradients.

In some of these embodiments, monitoring device may enter periods of over or under sampling in response to the need to record information with more resolution or fidelity. In some of these embodiments, a ship profile is loaded into the device at the time of shipment, and the progress of the shipment is monitored and alarms are generated in response to deviations from expected observations. In some of these embodiments, this information and analysis may be accomplished solely by the device, by the portal or in combination of the two working together.

Certain embodiments of the invention provide systems and methods in which a web portal controller automatically schedules a pickup for a next leg in the ship plan in response to a determination from scan code or other sensor data that a previous leg has been delivered, and where the time elapsed between the two can be varied by the customer or portal.

Certain embodiments of the invention provide systems and methods for tracking an object while the object is in transit. Some of these embodiments comprise providing a shippable object with an electronic tag. In some of these embodiments, the electronic tag is configured to periodically measure at least one environmental condition experienced by the shippable object. In some of these embodiments, the electronic tag is configured to detect the presence of one or more networks accessible by the electronic tag. In some of these embodiments, the electronic tag is configured to transmit information associated with the shippable object through the at least one accessible network when at least one accessible network is detected. In some of these embodiments, the transmitted information includes an identification of the shippable object and a history of at least one measurement of the environmental condition. In some of these embodiments, accessible networks include WiFi, WiMax, LAN, PAN, cellular and satellite networks. In some of these embodiments, accessible networks include networks having no encryption and/or password protection. In some of these embodiments, accessible networks include networks for which encryption keys and/or passwords are available to the electronic tag.

In some of these embodiments, presence of one or more accessible networks is detected after the shippable object is moved from a first location to a second location. In some of these embodiments, the electronic tag is configured to determining that the shippable object has been moved based on a loss of connection with a previously accessible network. In some of these embodiments, detecting the presence of one or more networks includes detecting a network accessible to the electronic tag while the shippable object is in transit between two physically remote locations. In some of these embodiments, the electronic tag is further configured to identify a physical location of the shippable object associated with each measurement of the environmental condition. In some of these embodiments, transmitting the information includes transmitting physical locations associated with measurements. In some of these embodiments, the shippable object comprises a shipping container having a temperature-stabilized chamber and wherein the electronic tag comprises a wireless sensor. In some of these embodiments, the at least one environmental condition includes a temperature of the temperature stabilized chamber. In some of these embodiments, the history of measurements comprises measurements obtained at a selected sample rate.

Some of these embodiments further comprise comparing the history of measurements with a set of expected measurements. Some of these embodiments comprise generating an alarm when the history of measurements deviates from the set of expected measurements by more than a maximum tolerance value. In some of these embodiments, the sample rate is adjusted based on a preselected variable and the physical location is identified based on identity of the at least one accessible network.

Figure 4:
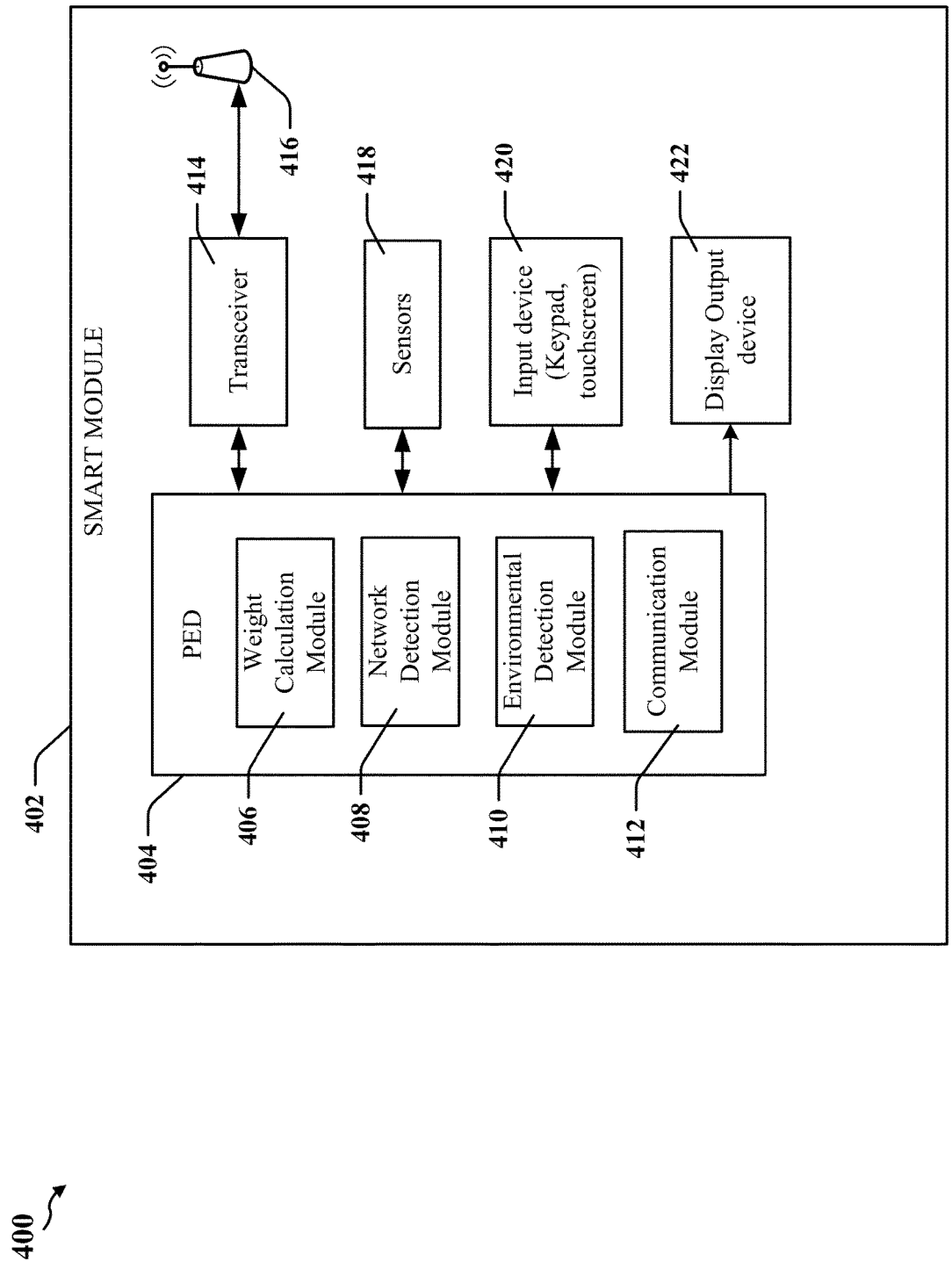
FIG. 4 illustrates a smart module according to certain aspects of the invention.

With reference also to FIG. 4, the Smart Module 402 may be configured to connect to a network by any available means. For the purposes of this description, a Smart Module 402 may comprise a processing circuit such as programmable electronic device (PED) 404. PED 404 may have some of or all of the elements shown in FIG. 7 and described in more detail below. PED 404 may include one or more of a power source, a display, a CPU, non volatile storage, a light emitting diode (LED) lamp or indicator, a button or switch, an aural alarm indicator, a radio frequency or optical or infrared transmitter and/or receiver, a global positioning system receiver, and analog-to-digital (A/D) converter, and a digital-to-analog converter (D/A). PED 404 may include or be coupled to a sensor or multiple sensors 418. The sensors 418 may comprise transducers that can be used to sense or measure pressure, acceleration, temperature, humidity, magnetic field, light, load, inclination, radio frequency identification (RFID) signals and or RFID return signals, whether related to a passive or active RFID tag. PED may additionally comprise a battery or energy scavenging device and a wired, wireless, infrared, or magnetically coupled interface that is coupled to an antenna 416 used for communications.

A Smart Module 402 may be added to the Shipping Container 102 to obtain a Smart Shipping package, which comprises a, cooled insulated package that monitors and reports status of a Thermal Source 110, package condition and location and that monitors, records and tracks significant events associated with a Smart Shipping package. Smart Module 402 may employ sensors 418 and one or more RF transceivers 414 that enable tracking the Shipping Container 102 while in transit. One or more RF transceivers 414 may respond to interrogation by networks encountered at various points while in transit. The one or more RF transceivers 414 may communicate and/or be associated with a plurality of distinct networks, rather than associating with a single logical network through a single login credential. In one example, the RF transceivers may transmit and receive data over any available network, including a plurality of different networks using different credentials.

The RF transceivers 414 may interrogate or otherwise initiate communication through networks encountered at various points while in transit. The Smart Module 402 may be interrogated by one or more devices connected to a network 114 upon establishment of connection between the Smart Module 402 and the network 114. The Smart Module 402 may also proactively transmit information through the network 114 upon determining presence of a suitable access point or access network and negotiating a connection with the access point or access network. The Smart Module 402 may transmit information using standard and proprietary network protocols in a connection-based or connectionless mode of operation. The Smart Module 402 may use telecommunication networks to send, for example, short messages and/or units of data.

The Smart Module 402 may refrain from communicating based on its location or mode of transit. In one example, the Smart Module 402 may suspend communication activities when it determines that the Shipping Container 102 is located aboard an airplane, during take off and landing, for example. The determination to refrain or recommence communication may be made based on an analysis of elapsed time, location, in response to monitored sensor inputs (temp, altitude, vibration, vibration, RF frequency detection, noise identifiable as speech, jet engines, machinery etc., absence of GPS signals when indoors, exposure to magnetic fields, orientation, presence or absence of (i) light or lighting with detectable characteristics (i.e. Kelvin), or absence thereof, and (ii) by external commands provided via magnetic, infrared or RF communications, and/or the detection of certain RF frequencies or determination of the presence or absence of a certain network address.

The Smart Module 402 may determine location of the Shipping Container 102 may be determined at various points during transit. A monitoring system may determine or infer the location of an object by correlating identifiable information in a wireless emission or transmission such as RF, infrared, magnetic, electromagnetic and other media, which is associated with a known and previously determined location. This may be accomplished by means of a single received transmission and/or by a series of related and/or unrelated emissions and/or transmissions. The Smart Module 402 may further determine or infer the location of an object by correlating scan code information provided by handlers of the Shipping Container 102 or by third parties. Scan code information typically comprises actual location information or location identifications made by inference or deduction from scan code information and/or the fusion of scan code information with other sensor or network information.

The Smart Module 402 may determine or infer the location of the Shipping Container 102 using GPS, by RFID "readers" or purposefully placed beaconing transmitters at pre-positioned "choke points" and/or by cellular network triangulation. The Smart Module 402 may determine or infer the location of an object within a building or finite area by means of an analysis of Received Signal Strength Indications (RSSI) or Time Differential of Arrival (TDOA) from one or more transceivers.

The Smart Module 402 may determine or infer the location of the Shipping Container 102 using an estimate of where the object should be based on the time elapsed since the Shipping Container 102 departed its point of origin. The Smart Module 402 may determine or infer the location of the Shipping Container 102 by observing the number of "hops" and duration of each hop, in a shipment as defined by a barometer detecting ascension to altitude.

Figure 5:
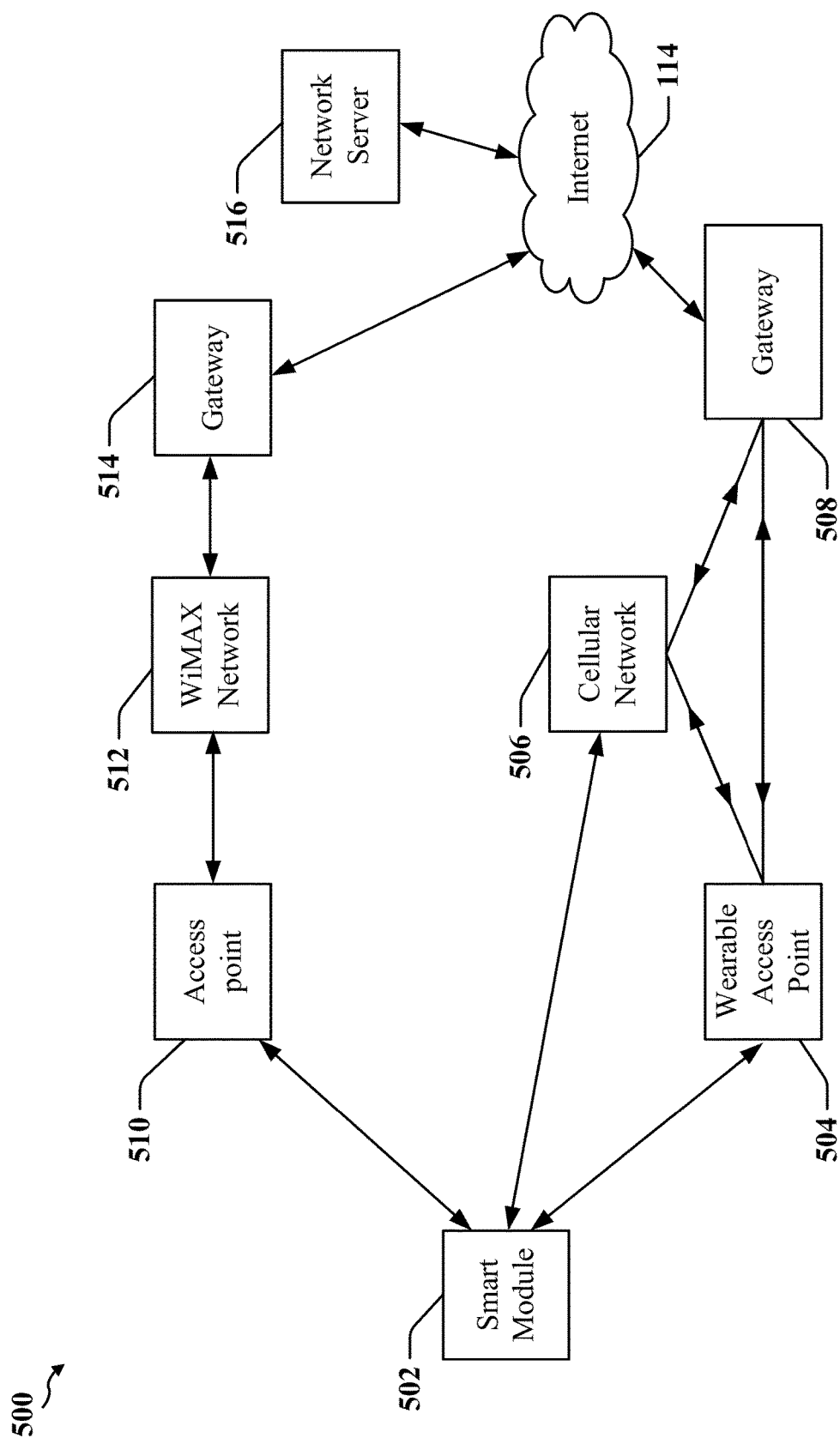
FIG. 5 illustrates network access by a smart module according to certain aspects of the invention.

With reference also to FIG. 5, The Smart Module 502 may exchange data with networked entities 516 using one or more networks 114 encountered while in transit. The process of information gathering or data harvesting from one or more Smart Modules 502 may be referred to herein as "data backhaul." Data may be harvested by means of a continuous wireless network (WLAN) connection such as GPRS or other cellular network 506, and/or a WiMAX network 512, and/or through purpose-built data collection agents placed in third party (e.g. customer or partner) locations and at strategic "choke-points" along the route of a shipping lane.

Data may be harvested using access points 510, peer devices 504 and other opportunistic network connections. Opportunistic harvesting may occur (i) when the object senses the availability of a temporary or transient local area network (LAN) or personal area network (PAN) agents at any time during their journey, (ii) when two or more objects exchange information among each other (ad-hoc) such that the first object that reaches a network connection uploads information from all other objects it encountered in its journey, and (iii) through mobile data collection agents which come in proximity to an object. Mobile data collection agents may be purposefully mounted on a vehicle or worn by a person or animal. In one example, the location of a Smart Container 102 may be known, and its logs offloaded through body-worn access points and/or worker cell phones enabled for opportunistic networking.

Figure 6:
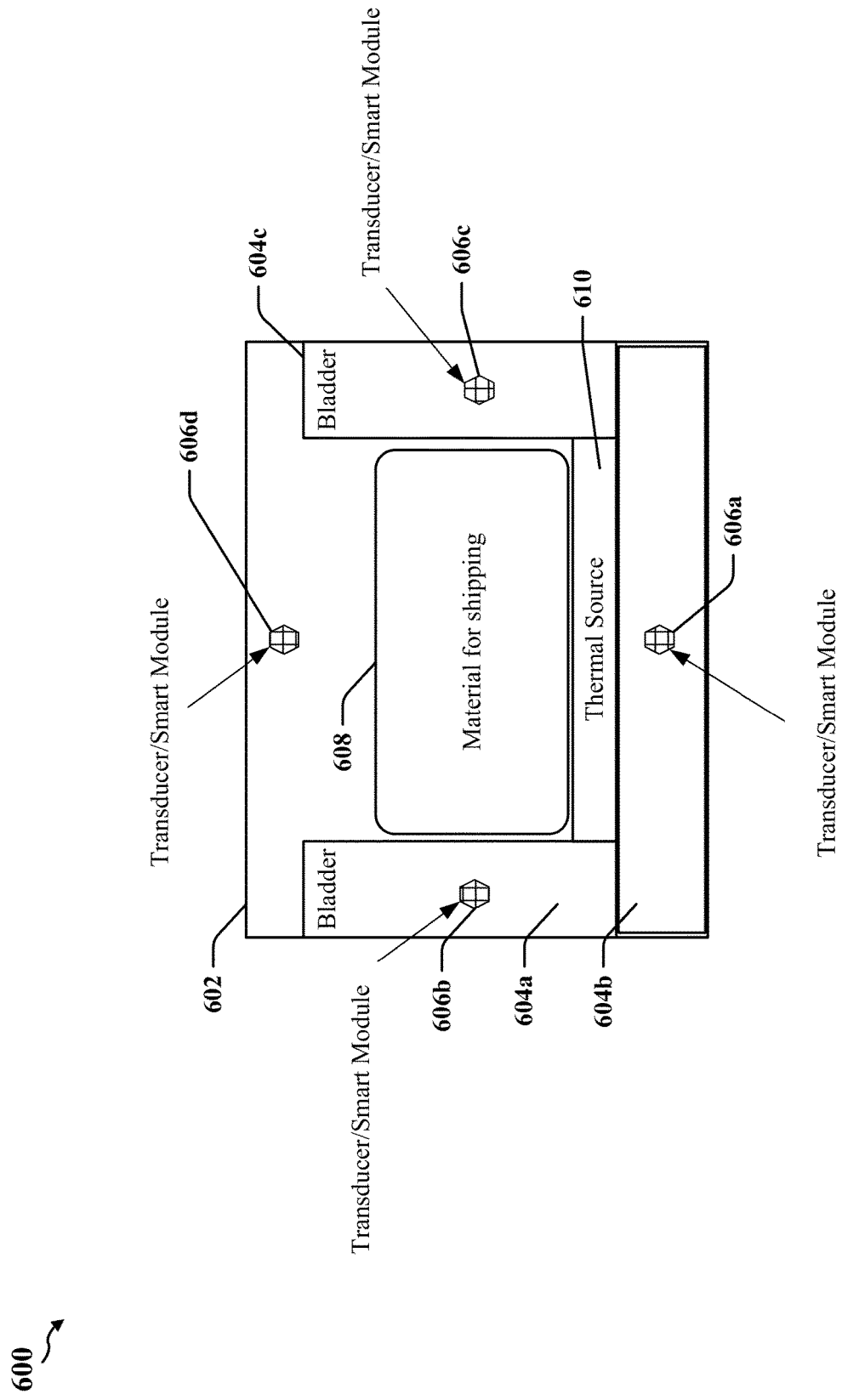
FIG. 6 illustrates a first example of a shipping container adapted according to certain aspects of the invention.
Figure 7:
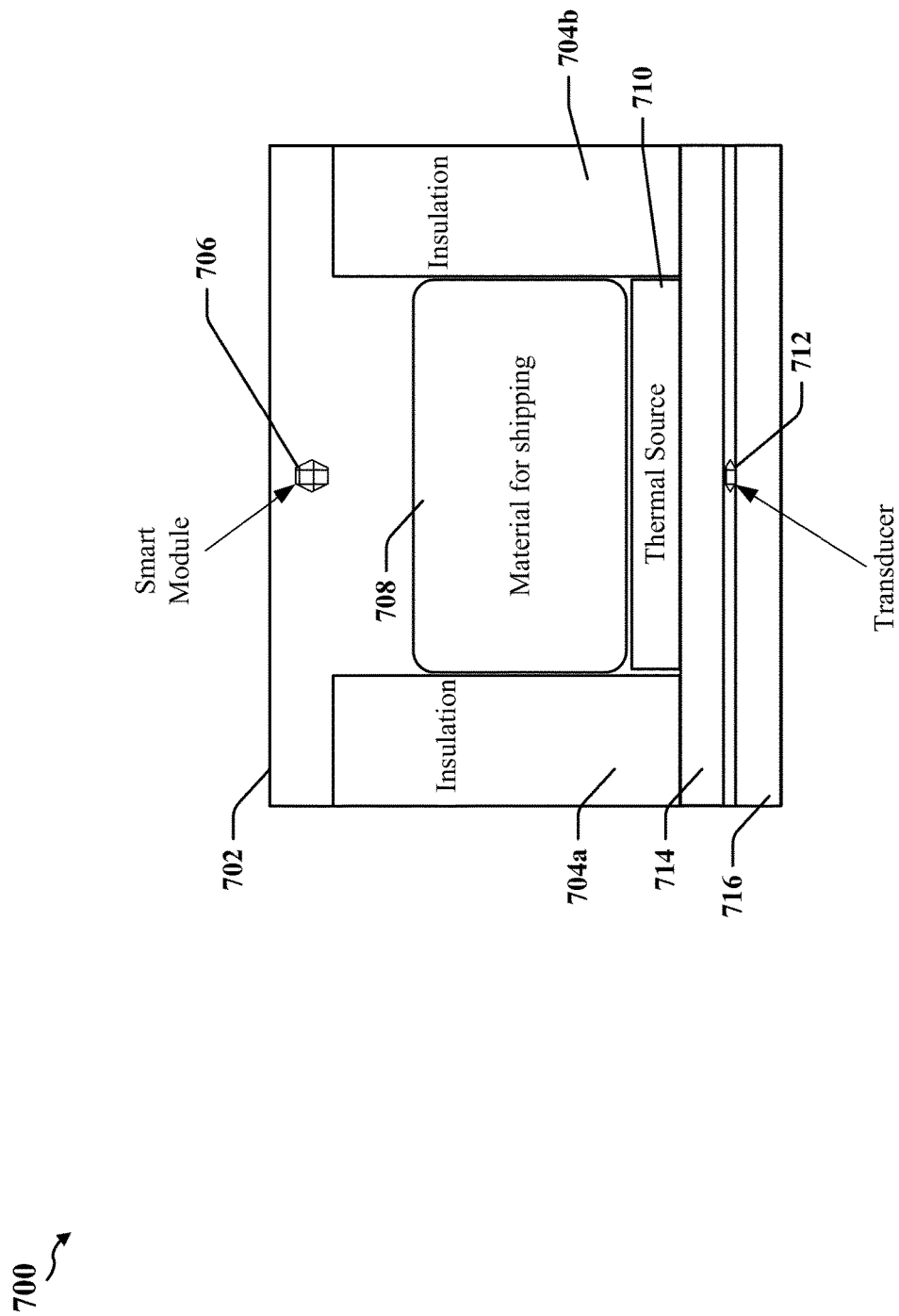
FIG. 7 illustrates a second example of a shipping container adapted according to certain aspects of the invention.

FIGS. 6 and 7 illustrate examples of a Smart Container 602 or 702 that is adapted to measure weights of Commodities 608, 708 and/or Thermal Sources 610, 710 in an inner enclosure, which maybe surrounded insulation 704*a*, 704*b* and/or one or more bladders 604*a*, 604*b*, 604*c*. In certain embodiments, the Shipping Container 102 may comprise a weight transducer 712 that can be used to measure the status of a Thermal Source 710 used to maintain the temperature of the Commodities at a desired level. In one example, one or more Smart Bladders 604*a*, 604*b*, 604*c* may be employed. The Bladders 604*a*, 604*b*, 604*c* may comprise a pressurized package, vessel or balloon-like device of various size, shapes and configuration which may be instrumented using one or more sensors coupled to a Smart Module 606*a*, 606*b*, 606*c*, 606*d*, which may be provided internal, partially internal, or entirely external to the Bladders 604*a*, 604*b*, 604*c*. The pressure detected in the bladders 604*a*, 604*b*, 604*c* may indicate a current weight of the package, including the Thermal Source 610 and the difference from initial weight may be used to determine the expected remaining life of the Thermal Source 610.

The weight of the inner enclosure may include the weight of the one or more Commodities 608, 708 and the Thermal Source 610, 710. A current weight of the Thermal Source 610, 710 may be calculated as the difference between the initial weight of the inner enclosure and a current weight of the inner enclosure. The weight calculation may include compensation for orientation and tilt of the container 602, 702, as well as ambient temperature and external air pressure. More than one bladder 604*a*, 604*b*, 604*c* may be provided to accommodate different orientations and tilts.

In another example, electromechanical and/or electromagnetic transducers 712 may be employed to determine the current weight of the package, and allow a calculation of remaining life of the Thermal Source 610, 710 by module 706. Transducers may be provided around the container 602, 702 to allow the weight to be measured regardless of orientation of the devices and/or tilt of the package.

In another example, the 702 may be fitted with a load cell or transducer 712 constructed using a MEMS device deployed between two rigid walls or plates 714, 716 that may be fabricated from a polymer, metal or suitable material, located in the bottom of a container. Accordingly, at least one wall or plate 714, 716 is located under the Thermal Source 610, 710 and can be measured by a transducer coupled to one or more of the at least one wall or plate 714, 716. Commodities 708 to be shipped and a phase-change material such as dry ice may be placed in the container 702. Given the weight of the container when empty and the weight of the Commodities, the weight of the phase-change material can be calculated by simple arithmetic. Adjustments may be made based on orientation and/or tilt.

Certain embodiments comprise a Thermal Source 610, 710 which may include a phase change material, a catalytic material, a mechanical device, and electro-mechanical system or other material or device which provides or removes thermal energy from the Shipping Container 602, 702 or an inner enclosure of the Shipping Container 602, 702 to heat or cool the Commodities 708 or Contents carried by the Shipping Container 602, 702.

Certain embodiments of the invention can stabilize temperature by maintaining a specific range of temperature in the Shipping Container or an inner enclosure of the Shipping Container using a Thermal Source and a means of insulating the Commodities from the forces of the environment. In one example, the Shipping Container may be at least partially wrapped in a thermally non-conductive material. In another example, the Shipping Container may comprise one or more layers that are thermally non-conductive. In another example, the Shipping Container may comprise an interstitial space that encloses a gas, a low-pressure gas and/or a vacuum. Temperature stabilization may be employed to store Commodities at, above, or below a targeted temperature range. When used for maintaining a predefined ambient or near-ambient temperature, the shipping container may rely on thermal mass to accomplish temperature stability. In certain embodiments, the Shipping Container may be shipped through the services of a carriage, transportation or overnight shipping company or by a third-party logistics provider.

Every year approximately 60 million parcels are shipped through domestic and international carriers to end-points around the world, each containing sensitive and valuable Commodities. Almost all carriers offer extra-cost services to track, monitor and manage these shipments, which frequently require special handling to protect their Commodities and require special documentation or export/import licenses.

Many government entities and agencies, such as the United States Food and Drug Administration (FDA), provide indirect control and supervision over the manufacture, shipping, storage and distribution of regulated products by requiring each manufacturer to develop and maintain FDA approved standard operating procedures (SOPs). SOPs prescribe the steps, sequences, methods and actions that will be employed by the manufacturer and their business partners to assure the proper handling, storage and distribution of regulated products. The SOP development process necessarily requires "proof" through documented testing proving that the prescribed methods and procedures contained within the SOP will result in the delivery of Commodities that are safe and effective and not otherwise damaged or degraded due to improper manufacture, handling or storage and distribution.

The FDA considers conformance to SOPs a matter of important public policy contributing to the health and safety of our health care system. Accordingly, there are many regulations published by FDA and other government or quasi-government agencies to enforce standards and "best-practices" on the shipment of temperature stabilized Commodities. Manufacturers of regulated products whose manufacturing, shipping, storing or distribution activities fail to conform to FDA approved SOPs are subject to fines, or in extreme cases, revocation of previously granted approvals.

Although the research activities including the shipment of Commodities used in research are exempt from government regulation, many non-regulated companies comply or partially comply with industry best practices relating to temperature stabilized Commodities in order to reduce risk and uncertainty in research and product development process. Taken all together, the market for the shipment of temperature stabilized Commodities is large, and exposes companies involved in the process to high cost and risk. Certain aspects of the invention reduce the risk of inaccurate test results, fines and the high cost of specialized packaging and services, and provide systems and methods for transporting Commodities at less cost and with more predictability and reliability.

For the purposes of this discussion, it will be assumed that shipping companies such as Federal Express, DHL, United Parcel Service (UPS), World Courier, offer specialty extra-cost services to assist manufacturers and distributors with conformance with SOPs. Aspects of the current invention supplement or replace shippers shipping and logistics processes, and address the unique requirements of cold-chain shipping.

The transport of temperature stabilized Commodities involves risk, uncertainty and high cost. The risk and uncertainty are attributable to the inability of shippers to monitor the condition and status of the shipment and the health of the Commodities contained therein, once it is placed in the hands of a shipping company. High costs are incurred when the Commodities in a temperature stabilized shipping container are damaged or lost due to environmental conditions such as shock or loss inability to maintain a desired temperature.

Figure 8:
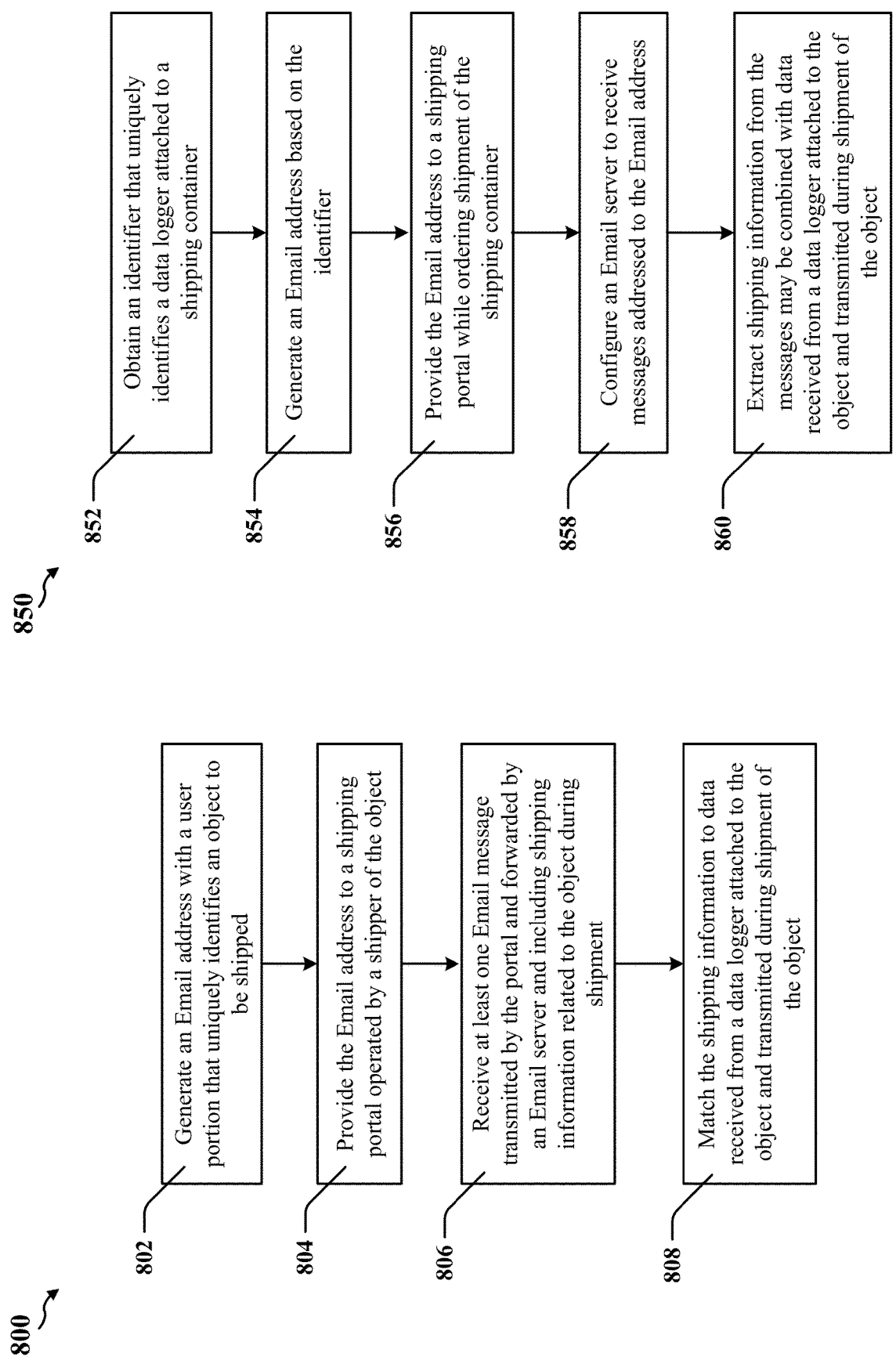
FIG. 8 is a flowchart illustrating a method of using a shipping container adapted according to certain aspects of the invention.

FIG. 8 includes a flowchart 800 that illustrates a method for tracking an object in transit. At step 802, an Email address is generated and has a user portion that uniquely identifies an object to be shipped.

At step 804, the Email address is provided to a shipping portal operated by a shipper of the object.

At step 806, at least one Email message is received. The Email message may be transmitted by the portal and forwarded by an Email server. The Email message may provide shipping information related to the object during shipment. The shipping information may include one or more of custody transfer, time, state and weight information and networks detected along a shipping route.

At step 808, the shipping information is matched to data received from a data logger attached to the object and transmitted during shipment of the object. Matching the shipping information to the data received from the data logger may include determining a location of the object corresponding to a time of capture of the data. Matching the shipping information to the data received from the data logger may include determining a current destination of the object corresponding to a time of capture of the data. The data received from the data logger may include one or more of an outside temperature, a sound frequency, altitude, absence or presence of a network and time-in-transit.

In some embodiments, a location of the object may be determined based on GPS coordinates provided in the shipping information or the data received from the data logger.

In some embodiments, matching the shipping information to the data received from the data logger may include matching an itinerary provided in the shipping information to one or more of a change detected in radio frequency environment, absence or presence of a network, the differential pressure, a vibration, an acceleration and a tilt is used to determine if the shipping container is on an aircraft or other vehicle.

In certain embodiments, the Email address is provided to the shipping portal by programmatically automating an interface to the shipping portal. The Email address may be provided by programmatically automating a form provided by the shipping portal includes automatically entering the Email address. The form may be programmatically automated by adding one or more helper modules to the form provided by the shipping portal. The form may be programmatically automated by intercepting information transmitted through the shipping portal, modifying the information and forwarding the modified information. Modifying the information may include populating one or more fields with information generated by a third party order-entry and/or tracking system. Modifying the information may include populating one or more fields with customer information maintained by a third party order-entry and/or tracking system. The form may be programmatically automated by providing analytics information related to one or more fields of the form provided by the shipping portal. The analytics information may include statistical information corresponding to on-time delivery history of the shipper. The analytics information may include cost information corresponding to the shipper and one or more alternative shippers.

FIG. 8 includes a flowchart 850 that illustrates a method for tracking an object in transit. At step 852, an identifier is obtained that uniquely identifies a data logger attached to a shipping container.

At step 854, an Email address based on the identifier is generated. The Email address may have a username derived from the identifier.

At step 856, the Email address may be provided to a shipping portal while ordering shipment of the shipping container.

At step 858, an Email server may be configured to receive messages addressed to the Email address.

At step 860, shipping information extracted from the messages may be combined with data received from a data logger attached to the object and transmitted during shipment of the object. The shipping information may include information identifying at least one departure location and at least one destination location and a last known location of the shipping container. The data received from the data logger may include a physical location of the object and a time of capture of the data.

In certain embodiments, a location of the object is determined based on GPS coordinates provided in the data received from the data logger.

In some embodiments, an electronic device is attached or otherwise coupled to the shipping container. The electronic device may comprise a smart module configured to communicate monitored parameters to a network and through the network to a server or one or more cloud-resident applications. In some embodiments the monitored parameters and other information may be processed and analyzed by the applications. In some embodiments, a cloud or server application can send a command back to the package to adjust configuration parameters or to determine if its location has changed. Configuration parameters may comprise sensor sample intervals, preferred, allowed or prohibited routes for network communications, and remote control of annunciators or visual media such as LED, or LCDs on the Smart Module or Shipping Container.

In some embodiments, the smart module may determine its location by reference to detected network infrastructure in the area. In some embodiments, the smart module may determine its location by detection or communication with other Smart Modules RF or RFID transmitters that may be present or absent nearby. In some embodiments, the smart module may determine its location by the absence or presence of Carrier generated shipping scan-codes received and processed by application servers. In some embodiments, the smart module may determine its location by through GPS derived coordinates, or through inference of other factors such as outside temperature, sound frequencies, vibration or inclination patterns, presence or absence of carrier scan codes, altitude or time-in-transit.

In some embodiments, the smart module may form a mesh network with other smart modules to extend communications range, improve throughput or share, compare or exchange data among themselves or with applications servers. In some embodiments, the smart module may issue a local auditable or visual alarm when any measurement or any condition observed is deemed critical or threatening to the protection of the Commodities.

In some embodiments, data received from a smart module may be fused with data received from carriers such as custody transfer, time, state and weight information. New information may be inferred from the merged data to improve the accuracy of location or delivery information, the health and status of the shipping container itself or the predictions and confidence of such predictions into the future.

System Description

Figure 9:
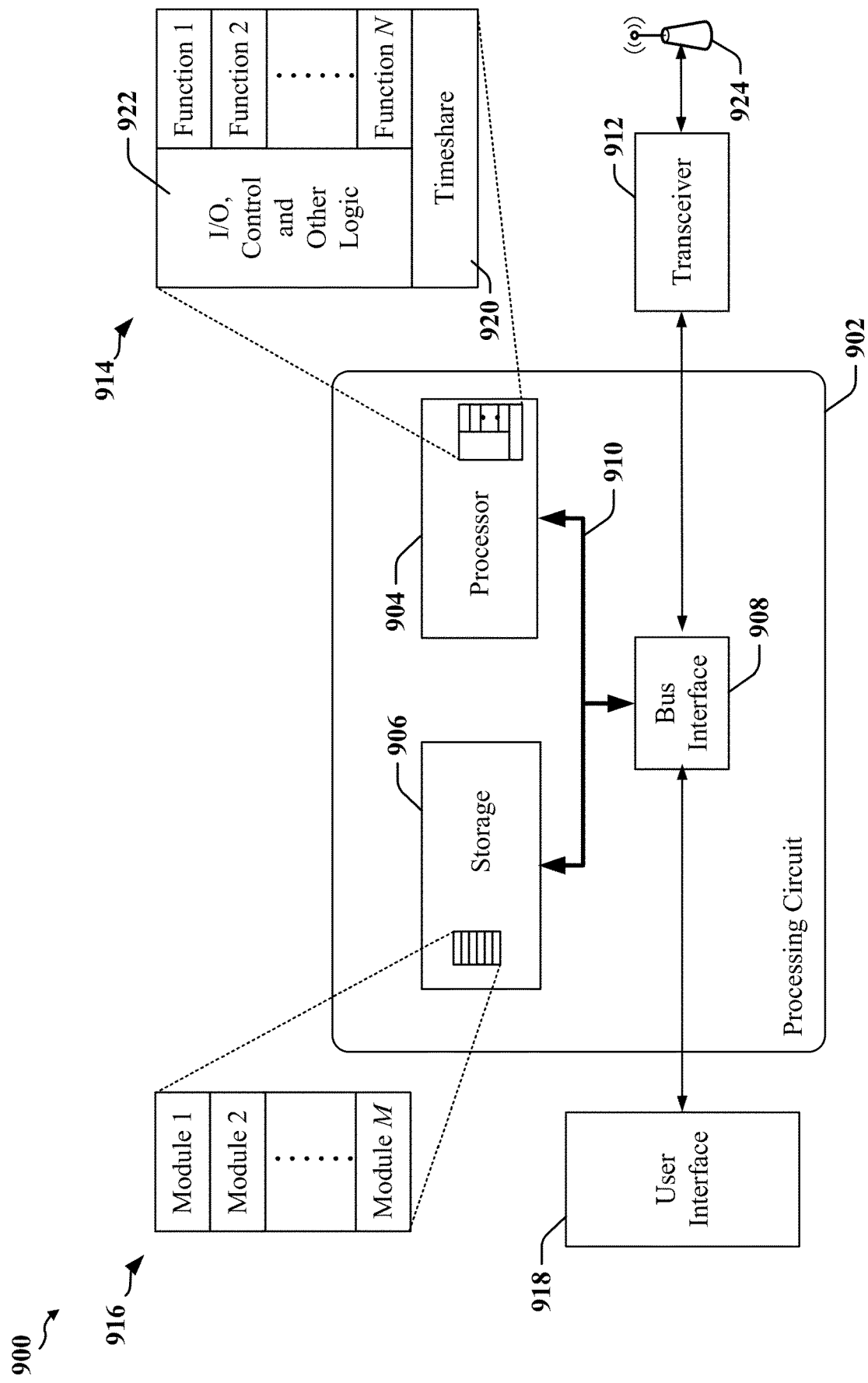
FIG. 9 is a block diagram illustrating an example of an apparatus employing a processing circuit that may be adapted according to certain aspects disclosed herein.

FIG. 9 is a conceptual diagram 900 illustrating a simplified example of a hardware implementation for an apparatus employing a processing circuit 902 that may be configured to perform one or more functions disclosed herein. In accordance with various aspects of the disclosure, an element, or any portion of an element, or any combination of elements as disclosed herein. The processing circuit 902 may include one or more processors 904 that are controlled by some combination of hardware and software modules. Examples of processors 904 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 904 may include specialized processors that perform specific functions, and that may be configured, augmented or controlled by one of the software modules 916. For example, the processing circuit may be configured as communications processors and other processors that are adapted to handle encoding and decoding of data for transmission on one or more wireless networks. The one or more processors 904 may be configured through a combination of software modules 916 loaded during initialization, and may be further configured by loading or unloading one or more software modules 916 during operation.

In the illustrated example, the processing circuit 902 may be implemented with a bus architecture, represented generally by the bus 910. The bus 910 may include any number of interconnecting buses and bridges depending on the specific application of the processing circuit 902 and the overall design constraints. The bus 910 links together various circuits including the one or more processors 904, and storage 906. Storage 906 may include memory devices and mass storage devices, and may be referred to herein as computer-readable media. The bus 910 may also link various other circuits such as timing sources, timers, peripherals, voltage regulators, and power management circuits. A bus interface 908 may provide an interface between the bus 910 and one or more transceivers 912 or line interface circuit. A transceiver 912 may include encoders, decoders, and radio frequency transmitters and receivers that are used in communicating with various other apparatus over a wireless network or through an opportunistic wireless connection. Depending upon the nature of the apparatus, a user interface 918 (e.g., keypad, display, speaker, microphone, joystick) may also be provided, and may be communicatively coupled to the bus 910 directly or through a bus interface 908.

A processor 904 may be responsible for managing the bus 910 and for general processing that may include the execution of software stored in a computer-readable medium that may include the storage 906. In this respect, the processing circuit 902, including the processor 904, may be used to implement any of the methods, functions and techniques disclosed herein. The storage 906 may be used for storing data that is manipulated by the processor 904 when executing software, and the software may be configured to implement any one of the methods disclosed herein.

One or more processors 904 in the processing circuit 902 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 906 or in an external computer readable medium. The computer-readable medium and/or storage 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 906 may also include, by way of example, a carrier wave, a transmission line, and any other suitable medium for transmitting software and/or instructions that may be accessed and read by a computer. The computer-readable medium and/or the storage 906 may reside in the processing circuit 902, in the processor 904, external to the processing circuit 902, or be distributed across multiple entities including the processing circuit 902. The computer-readable medium and/or storage 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 906 may maintain software maintained and/or organized in loadable code segments, modules, applications, programs, etc., which may be referred to herein as software modules 916. Each of the software modules 916 may include instructions and data that, when installed or loaded on the processing circuit 902 and executed by the one or more processors 904, contribute to a run-time image 914 that controls the operation of the one or more processors 904. When executed, certain instructions may cause the processing circuit 902 to perform functions in accordance with certain methods, algorithms and processes described herein.

Some of the software modules 916 may be loaded during initialization of the processing circuit 902, and these software modules 916 may configure the processing circuit 902 to enable performance of the various functions disclosed herein. For example, some software modules 916 may configure internal devices and/or logic circuits 922 of the processor 904, and may manage access to external devices such as the transceiver 912, the bus interface 908, the user interface 918, timers, mathematical coprocessors, and so on. The software modules 916 may include a control program and/or an operating system that interacts with interrupt handlers and device drivers, and that controls access to various resources provided by the processing circuit 902. The resources may include memory, processing time, access to the transceiver 912, the user interface 918, and so on.

One or more processors 904 of the processing circuit 902 may be multifunctional, whereby some of the software modules 916 are loaded and configured to perform different functions or different instances of the same function. The one or more processors 904 may additionally be adapted to manage background tasks initiated in response to inputs from the user interface 918, the transceiver 912, and device drivers, for example. To support the performance of multiple functions, the one or more processors 904 may be configured to provide a multitasking environment, whereby each of a plurality of functions is implemented as a set of tasks serviced by the one or more processors 904 as needed or desired. In one example, the multitasking environment may be implemented using a timesharing program 920 that passes control of a processor 904 between different tasks, whereby each task returns control of the one or more processors 904 to the timesharing program 920 upon completion of any outstanding operations and/or in response to an input such as an interrupt. When a task has control of the one or more processors 904, the processing circuit is effectively specialized for the purposes addressed by the function associated with the controlling task. The timesharing program 920 may include an operating system, a main loop that transfers control on a round-robin basis, a function that allocates control of the one or more processors 904 in accordance with a prioritization of the functions, and/or an interrupt driven main loop that responds to external events by providing control of the one or more processors 904 to a handling function.

The processing circuit 902 may include a communication interface including the transceiver 912 and antenna 924 that provides two-way data communication over one or more networks that may include a private and/or local network 216, and/or a wide area network such as the Internet 206 (see FIG. 2). In one example, an integrated services digital network (ISDN) may used in combination with a local area network (LAN). In another example, a LAN may include a wireless link. A network link typically provides data communication through one or more networks to other data devices. The processing circuit 902 may use the one or more networks to send messages and data, including program code and other information. In one example, an Internet-connected server may transmit a requested code for an application program through Internet 206 and may receive code that may be executed by processor 904.

Figure 10:
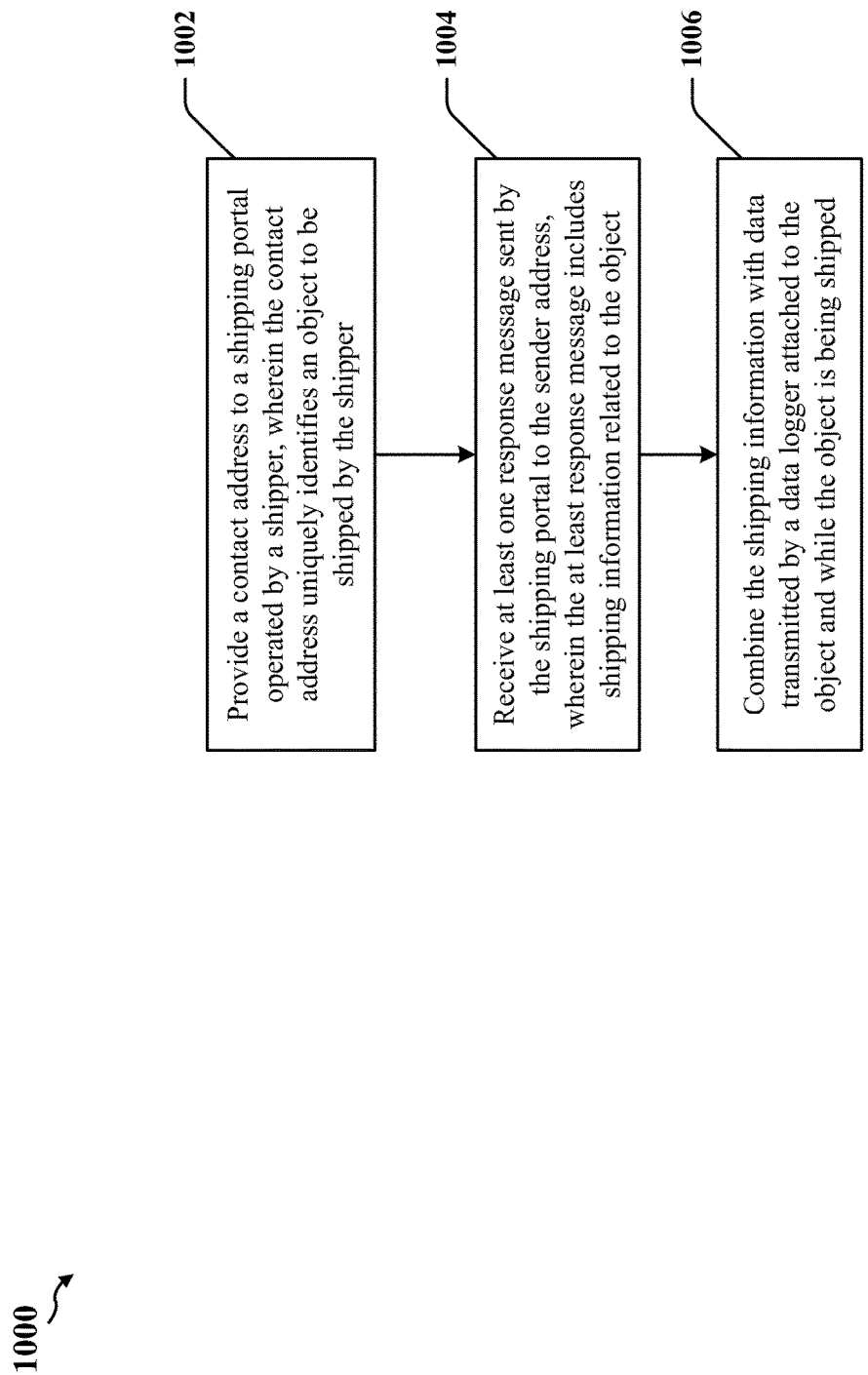
FIG. 10 is a flowchart illustrating a second example of a method of system-independent data logging.

FIG. 10 is a flowchart 1000 illustrating a method for tracking an object in transit according to certain aspects disclosed herein. At step 1002, a contact address is provided to a shipping portal operated by a shipper. The contact address may uniquely identify an object that is intended for shipment by the shipper. The contact address may include a unique identifier maintained by the data logger. The electronic message may be generated by creating an association between the object and an address that is reserved for tracking shipments, and using the address that is reserved for tracking shipments as the contact address.

At step 1004, at least one response message is received. The at least one response message may be sent by the shipping portal to the contact address. The at least one response message may include shipping information related to the object. The shipping information may include a tracking identifier generated for the object by the shipper.

At step 1006, the shipping information may be combined with data transmitted by a data logger attached to the object and while the object is being shipped.

In certain instances, the at least one response message includes a current or last-known location of the object. A location of the object may be determined based on the current or last-known location of the object and location information received from the data logger. An arrival time at one or more destinations of the object may be estimated based on the current or last-known location of the object and the data transmitted by the data logger time. The data transmitted by the data logger may include a time of capture of the data transmitted by the data logger. The data transmitted by the data logger includes information related to a current or recent location of the object. An arrival time at one or more destinations of the object may be estimated based on the information related to the current or recent location of the object.

In some instances, the at least one response message includes information identifying status of the shipment, one or more commodity codes, expected delivery date. The status of the shipment may identify the shipment as delayed, not deliverable, "Out for Delivery" or subject to a Custody Transfer. The status of the shipment may relate to a weight or other measurement that may change over time, including when thermal mass is consumed in transit. In one example, status information may be obtained from one or more Scan Codes.

In certain aspects of the invention, the data transmitted by the data logger includes an outside temperature, a sound frequency, altitude, time-in-transit information, or information identifying absence or presence of an identifiable network. The shipping information may identify a custody transfer, a current shipping state, weight information, or a shipping route associated with the object. In one example, the shipping information may be derived from or otherwise based on a scan code obtained at a waypoint in the shipment.

In some instances, an itinerary provided in the shipping information may be matched with location-related information transmitted by the data logger. The location-related information may include at least one of a change detected in RF environment, absence of a network, presence of a network, a measurement of pressure, a vibration, an acceleration or a tilt.

According to certain aspects disclosed herein, the contact address may include an Email address having a configurable portion therein. The Email address may be provided to the shipping portal by programmatically automating an interface to the shipping portal. The contact address may include an Email address may be provided to the shipping portal by programmatically automating a form provided by the shipping portal, which may include automatically entering the Email address. The form may be programmatically automated by intercepting information transmitted through the shipping portal, modifying the information, and forwarding modified information. The form may be programmatically automated by providing analytics information related to one or more fields of the form. The analytics information may include pricing information corresponding to the shipper, pricing information corresponding to one or more alternative shippers or statistical information corresponding to an on-time delivery history of the shipper. The contact address may include an Email address that includes a hash of information that uniquely identifies the object to be shipped.

According to certain aspects disclosed herein, the contact address may be an address usable on a messaging system or social networking system. In one example, certain SMS-capable telephone numbers may be reserved for use in tracking objects in transit, such that a telephone number associated with a data logger may be submitted manually or automatically through a portal application of a shipment order entry or tracking site. Shipping information may then be sent in one or more SMS messages. In another example, the telephone numbers may be subscribed to a multimedia messaging system ("MMS") and the shipping information maybe received via MMS messages. In another example, one or more identities may be established in a social networking environments such as Twitter, Facebook, Instagram, etc., and such identities may be used for tracking objects in transit. That is, an identity of a social networking or other network capable of communications may be associated with a data logger and submitted manually or automatically through a portal application of a shipment order entry or tracking site. Shipping information may then be provided by the Shipper in messages or postings directed to the identity. A processing circuit or system adapted according to certain aspects disclosed herein may be adapted to receive or retrieve SMS and other types of messages and postings and to associate information in such messages and postings with the datalogger and/or corresponding shipped object.

Figure 11:
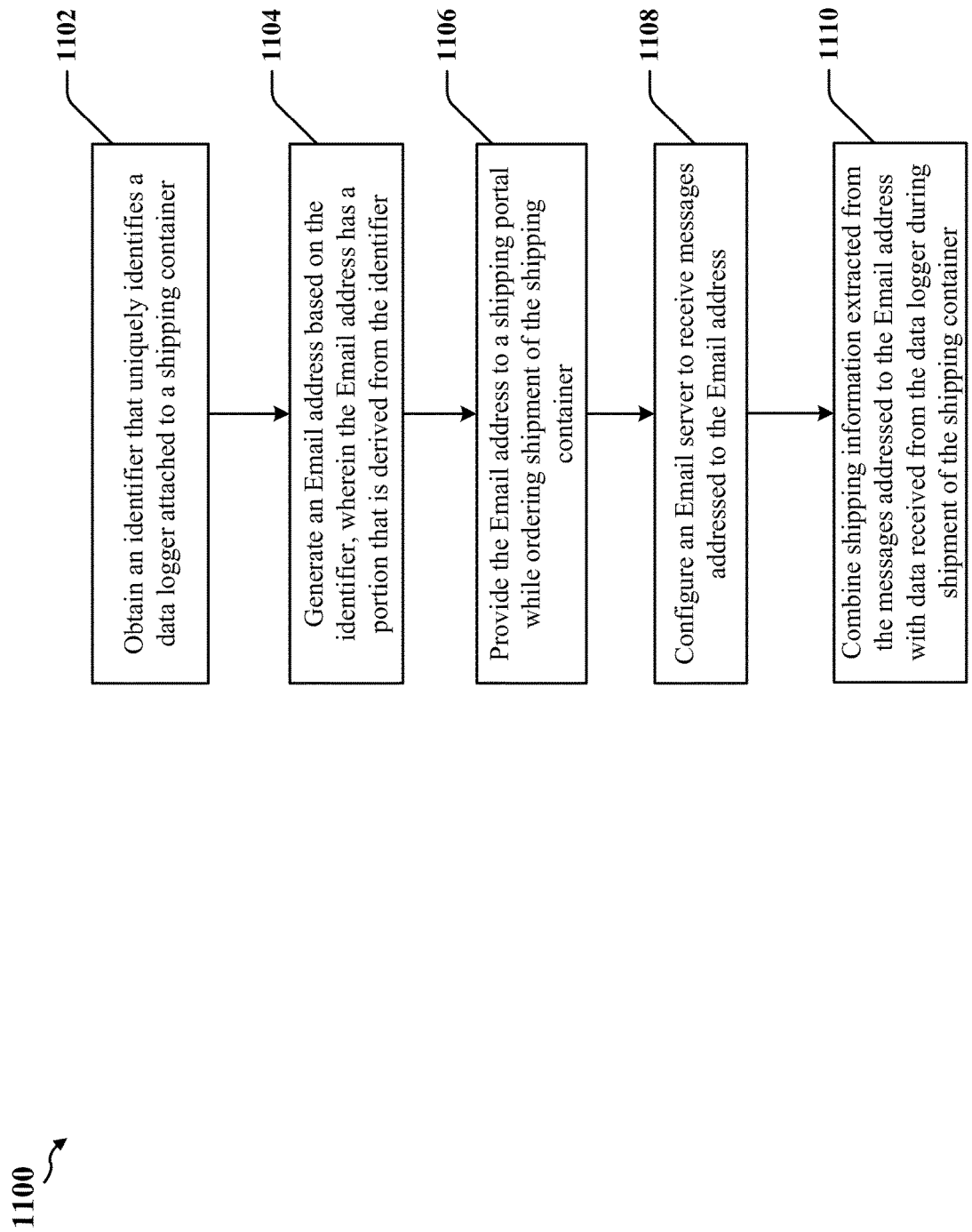
FIG. 11 is a flowchart illustrating a first example of a method of system-independent data logging.

FIG. 11 is a flowchart 1100 illustrating a method for tracking an object in transit according to certain aspects disclosed herein. At step 1102, an identifier is obtained. The identifier may uniquely identify a data logger attached to a shipping container.

At step 1104, an Email address is generated based on the identifier. The Email address may have a portion that is derived from the identifier.

At step 1106, the Email address is provided to a shipping portal while shipment of the shipping container is being ordered.

At step 1108 an Email server may be configured to receive messages addressed to the Email address.

At step 1110 shipping information extracted from the messages addressed to the Email address may be combined with data received from the data logger during shipment of the shipping container.

The shipping information may include information identifying at least one departure location and at least one destination location or a last known location of the shipping container. Data received from the data logger may include a physical location of the object and a time of capture of the data.

Figure 12:
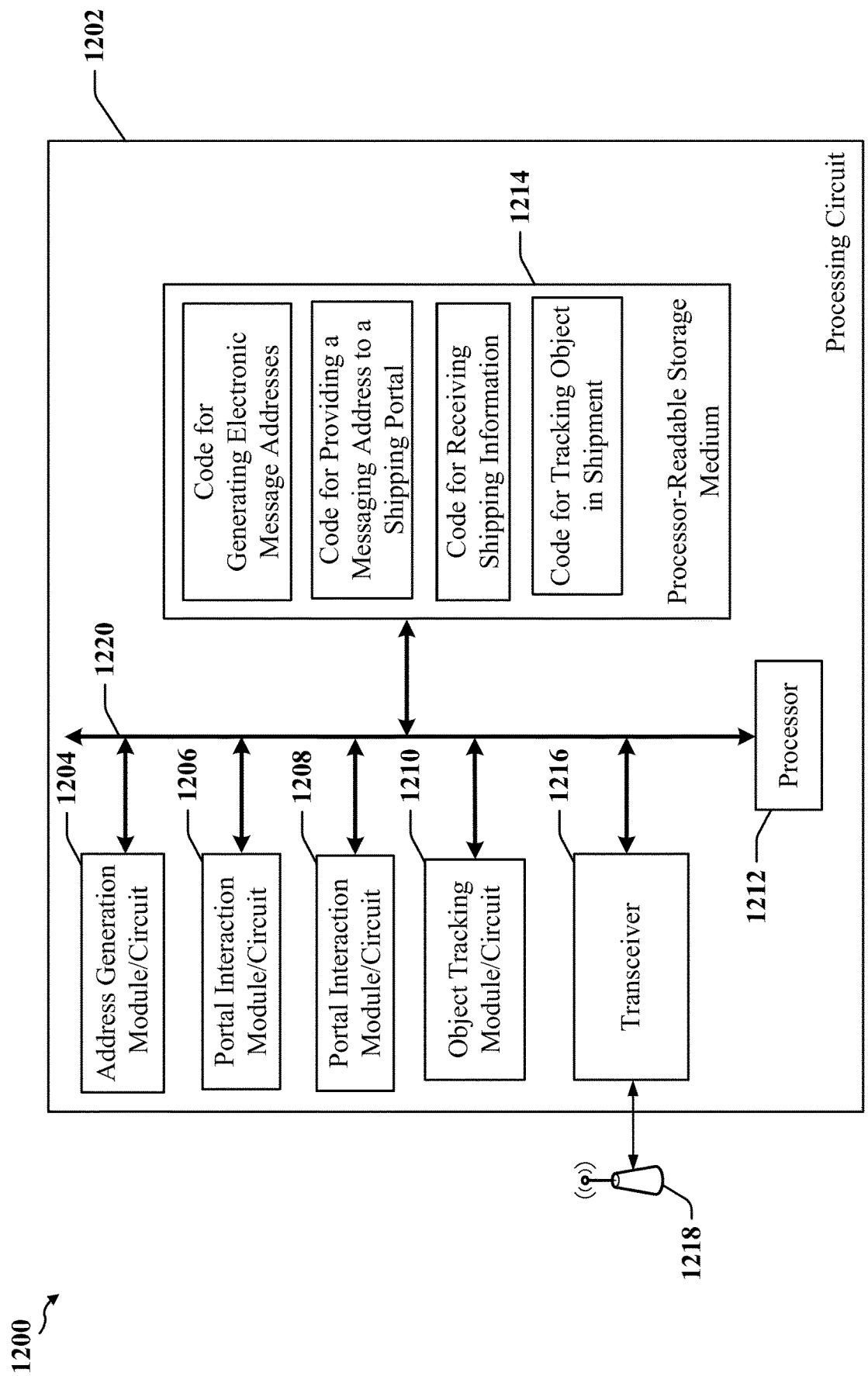
FIG. 12 is a diagram illustrating an example of a hardware implementation for an apparatus adapted for system-independent data logging.

FIG. 12 is a conceptual diagram illustrating an example of a hardware implementation for an apparatus 1200 employing a processing circuit 1202. In this example, the processing circuit 1202 may be implemented with a bus architecture, represented generally by the bus 1220. The bus 1220 may include any number of interconnecting buses and bridges depending on the specific application of the processing circuit 1202 and the overall design constraints. The bus 1220 links together various circuits including one or more processors, represented generally by the processor 1212, and computer-readable media, represented generally by the processor-readable storage medium 1214. One or more timers may be connected to the bus and/or may be directly accessible or embodied in a processor 1212. The bus 1220 may also link various other circuits such as timing sources, timers, peripherals, voltage regulators, and power management circuits. A transceiver 1216 may provide wireless communications through the operation of at least one antenna 1218. Depending upon the nature of the apparatus, a user interface may be provided to support devices such as a keypad, a display, a speaker, a microphone, a joystick, and the like.

The processor 1212 is responsible for managing the bus 1220 and general processing, including the execution of software stored on the processor-readable storage medium 1214. The software, when executed by the processor 1212, causes the processing circuit 1202 to perform the various functions described supra for any particular apparatus. The processor-readable storage medium 1214 may be used for storing data that is manipulated by the processor 1212 when executing software. The processor-readable storage medium 1214 may also be used for storing system information related to one or more remotely managed devices (e.g. profiles), and the apparatus 1200 itself.

In one configuration the processing circuit 1202 may perform one or more functions in a system configured to monitor and/or manage a shipment of an object. The processing circuit 1202 may include a module or circuit 1204 configured to generate a unique address for receiving messages related to the object being shipped, a module or circuit 1206 configured to manipulate or modify a portal to a shipment order entry or tracking system, a module or circuit 1208 configured to extract information from messages sent by the portal or transmitted by a smart module attached to the object being shipped, and a module or circuit 1210 configured to track the object and/or provides analytics information related to the object and/or shipper.

Additional Descriptions of Certain Aspects of the Invention

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments of the invention provide a container that may be used in shipping. In certain embodiments the container comprises an inner enclosure adapted to carry one or more Commodities during shipment. In certain embodiments the container comprises a bladder conformed to the inner surface of the inner chamber and instrumented with at least one transducer. In certain embodiments the container comprises a processing device configured to receive measurements from the at least one transducer, and to communicate the measurements to a networked device upon detecting the presence of a network.

In some of these embodiments, the networked device processes the measurements using a cloud-resident application. In some of these embodiments, the networked device transmits a command to the processing device that causes the processing device to adjust a configuration parameter. In some of these embodiments, the configuration parameter configures one or more of a sensor sample interval, a preferred network communication route, an allowed or prohibited network communication route, and a remote control of annunciators provided on the shipping container.

In some of these embodiments, the processing device is configured to determine a location of the shipping container based on network infrastructure detected by the processing device. In some of these embodiments, the network infrastructure comprises processing device s associated with one or more other shipping containers. In some of these embodiments, the processing device is configured to determine a location of the shipping container based on absence or presence of a shipping scan-code associated with the shipping container. In some of these embodiments, the processing device is configured to determine a location of the shipping container based on GPS derived coordinates. In some of these embodiments, the processing device is configured to determine a location of the shipping container based on one or more factors including an outside temperature, a sound frequency, altitude and time-in-transit.

In some of these embodiments, information transmitted by the processing device is fused with data received from a carrier. In some of these embodiments, the data received from the carrier includes one or more of custody transfer, time, state, and weight information.

In some of these embodiments, the bladder has a shape adapted to conform to certain contours of the shipping container, thereby providing maximum protection of the Thermal Source and the one or more Commodities. In some of these embodiments, the bladder has a shape that minimizes movement of an inner chamber of the container. In some of these embodiments, the bladder has a shape that accommodates protrusions from a Dewar, including handles and fill tubes. In some of these embodiments, the bladder has one or more pockets that hold Commodities, accessories or documentation.

In some of these embodiments, a processing device attached to the bladder measures the pressure of at least one bladder segment. Some of these embodiments comprise a band configured to maintain the bladder in a desired position. In some of these embodiments, a strain gauge measures the stress load of the band, the stress load being indicative of the weight of the Thermal Source. In some of these embodiments, the measurement of the stress load of the band is used to determine the weight of the one or more Commodities. In some of these embodiments, the bladder absorbs shock and vibration. In some of these embodiments, the bladder is multi-segmented, each segment maintaining a uniform pressure such that vectors of arrival of the shock and vibration are perpendicular to the one or more Commodities.

In some of these embodiments, differential pressure between at least a segment of the bladder and external atmospheric pressure is used to adjust pressure measurements responsive to changes in atmospheric pressure. In some of these embodiments, the differential pressure is used to calculate altitude of an aircraft, wherein the altitude is calculated based on acceleration. In some of these embodiments, pressure measurements are based on the evaluation of its tilt or orientation in reference to the center of the earth. In some of these embodiments, the bladder comprises a material or mesh having elastic properties that limit volumetric expansion, thereby assuring accurate pressure measurement.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The word "exemplary" as used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A non-transitory processor-readable storage medium having code stored thereon that, when executed by at least one processing circuit, causes the at least one processing circuit to:
   receive, at a tracking system, location data acquired by a data acquisition device attached to an object that is in transit, wherein the data acquisition device is coupled to one or more sensor devices that provide the location data, and wherein the data acquisition device is adapted to wirelessly communicate the location data using a radio frequency interface;
   generate an electronic mail (Email) address, the Email address comprising a domain name that identifies the tracking system and an identifying portion that includes an identifier that uniquely identifies the data acquisition device, wherein Email messages transmitted to the Email address are received at the tracking system;
   provide the Email address to a shipping portal while ordering shipment of the object;
   receive at least one Email message sent by the shipping portal to the Email address, wherein the at least one Email message includes shipping information related to the object; and
   determine updated locations of the object using a combination of the shipping information included in the at least one Email message and the location data acquired by the data acquisition device during shipment of the object.

2. The storage medium of claim 1, wherein the shipping information comprises a tracking identifier generated by a shipper for the object.

3. The storage medium of claim 1, wherein the Email address includes a media access control address of the data acquisition device.

4. The storage medium of claim 1, wherein the code further causes the processing circuit to:
   associate the identifier that uniquely identifies the data logger with information identifying the object in a communication received from a shipper of the object.

5. The storage medium of claim 1, wherein the at least one Email message includes a status of the shipment of the object, including a current or last-known location of the object.

6. The storage medium of claim 5, and further comprising: determining a location of the object based on the current or last-known location of the object included in the at least one Email message and the location data acquired by the data acquisition device.

7. The storage medium of claim 5, wherein the code further causes the processing circuit to:
   estimate an arrival time at one or more destinations of the object based on the current or last-known location of the object and the location data acquired by the data acquisition device,
   wherein the location data acquired by the data acquisition device includes a time of capture of the location data.

8. The storage medium of claim 1, wherein the location data acquired by the data acquisition device includes information related to a current or recent location of the object.

9. The storage medium of claim 8, wherein the code further causes the processing circuit to:
estimate an arrival time at one or more destinations of the object based on the information related to the current or recent location of the object.

10. The storage medium of claim 1, wherein the code further causes the processing circuit to:
receive additional information acquired from the one or more sensor devices and transmitted by the data acquisition device, the additional information including an outside temperature, a sound frequency, altitude, time-in-transit information, or information identifying absence or presence of an identifiable network.

11. The storage medium of claim 1, wherein the shipping information identifies a custody transfer, a current shipping state, weight information, or a shipping route associated with the object.

12. The storage medium of claim 1, wherein the code further causes the processing circuit to:
match an itinerary provided in the shipping information with location-related information sensed by the data acquisition device, the location-related information comprising at least one of a change detected in radio frequency environment, absence of a network, presence of a network, a measurement of pressure, a vibration, an acceleration or a tilt.

13. The storage medium of claim 1, wherein the Email address is provided to the shipping portal automatically entering the Email address on a programmatically automated form provided by the shipping portal by:
intercepting information transmitted through the shipping portal;
modifying the information transmitted through the shipping portal; and
forwarding the modified information.

14. The storage medium of claim 1, wherein the code further causes the processing circuit to:
provide analytics information related to one or more fields of a programmatically automated form provided by the shipping portal, wherein the analytics information includes pricing information corresponding to a shipper of the object, pricing information corresponding to one or more alternative shippers or statistical information corresponding to an on-time delivery history of the shipper.

15. The storage medium of claim 1, wherein the at least one Email message includes time-related information associated with the object, including a delivery date or estimated delivery date.

16. The storage medium of claim 1, wherein the at least one Email message includes a travel history of the object.

17. A non-transitory processor-readable storage medium having instructions stored thereon that, when executed by at least one processing circuit, cause the at least one processing circuit to:
receive, at a tracking system, location data acquired by a data logger attached to a shipping container, wherein the data logger receives information from one or more sensor devices and is adapted to wirelessly communicate the location data using a radio frequency interface;
obtain an identifier that uniquely identifies the data logger attached to the shipping container;
generate an electronic mail (Email) address, the Email address comprising a domain name that identifies the tracking system and an identifying portion that includes the identifier that uniquely identifies the data logger, wherein messages are directed to the tracking system when transmitted to the Email address;
provide the Email address to a shipping portal while ordering shipment of the shipping container;
configure an Email server to receive Email messages addressed to the Email address; and
track location of the shipping container using a combination of shipping information extracted from the Email messages addressed to the Email address with the location data received from the data logger during shipment of the shipping container.

18. The storage medium of claim 17, wherein the shipping information includes information identifying a departure location, a destination location or a last known location of the shipping container.

19. The storage medium of claim 17, wherein location data received from the data logger includes a physical location of an object that is in transit and a time of capture of the location data.

20. The storage medium of claim 17, wherein the location of the shipping container is tracked as a travel history of the shipping container comprising a current or last-known location of the shipping container.

* * * * *